United States Patent
Helard et al.

(10) Patent No.: US 7,729,436 B2
(45) Date of Patent: Jun. 1, 2010

(54) RECEIVER AND METHOD FOR DECODING A CODED SIGNAL WITH THE AID OF A SPACE-TIME CODING MATRIX

(75) Inventors: Maryline Helard, Rennes (FR); Rodolphe Le Gouable, Cesson Sevigne (FR); Pierre-Jean Bouvet, Rennes (FR); Vincent Le Nir, Rennes (FR)

(73) Assignee: France Telecom, Paris (FR)

( * ) Notice: Subject to any disclaimer, the term of this patent is extended or adjusted under 35 U.S.C. 154(b) by 808 days.

(21) Appl. No.: 10/568,942

(22) PCT Filed: Mar. 5, 2004

(86) PCT No.: PCT/FR2004/000538
§ 371 (c)(1),
(2), (4) Date: Dec. 27, 2006

(87) PCT Pub. No.: WO2005/029757
PCT Pub. Date: Mar. 31, 2005

(65) Prior Publication Data
US 2007/0140370 A1 Jun. 21, 2007

(30) Foreign Application Priority Data
Sep. 1, 2003 (FR) .................................. 03 10360

(51) Int. Cl.
*H04L 1/02* (2006.01)
(52) U.S. Cl. .................... 375/267; 375/340; 375/316
(58) Field of Classification Search .............. 375/340, 375/316, 267
See application file for complete search history.

(56) References Cited

U.S. PATENT DOCUMENTS 5,856,980 A * 1/1999 Doyle .......................... 714/704
5,859,875 A * 1/1999 Kato et al. ................... 375/267

FOREIGN PATENT DOCUMENTS

EP          1 133 071 A2       9/2001

OTHER PUBLICATIONS

Meixia Tao et al., "Low Complexity Post-Ordered Iterative Decoding for Generalized Layered Space-Time Systems," IEEE 2001, pp. 1137-1141.
Jaeyoung Kwak et al., "A Blind Space-Time Adaptive Multiuser Detector for DS-CDMA Communication Systems," IEEE 1998, pp. 1069-1073.

(Continued)

*Primary Examiner*—Shuwang Liu
*Assistant Examiner*—Michael R Neff
(74) *Attorney, Agent, or Firm*—Westman, Champlin & Kelly, P.A.; David D. Brush

(57) ABSTRACT

The disclosure relates to a method for decoding a received signal comprising symbols which are distributed in space and time with the aid of a space-time coding matrix, comprising a space-time decoding stage and at least two iterations, each of which comprising the following sub-stages: diversity pre-decoding, the opposite of diversity pre-decoding carried out when the signal is emitted, providing precoded data; estimation of symbols forming said signal on the basis of said pre-decoded data, providing estimated symbols; diversity preceding identical to diversity preceding carried out during emission, applied to the estimated symbols in order to provide an estimated signal.

17 Claims, 18 Drawing Sheets

OTHER PUBLICATIONS

H. Yang et al., "Performance of Space-Time Trellis Codes in Frequency Selective WCDMA Systems," IEEE 2002, pp. 233-237.

G. Bauch et al., "Reduced-Complexity Space-Time Turbo-Equalization for Frequency-Selective MIMO Channels, " IEEE Transactions on Wireless Comm., vol. 1, No. 4, Oct. 2002 pp. 819-828.

H. Jafarkhani, "A Quasi-Orthogonal Space-Time Block Code," IEEE Transaction on Comm., vol. 49, No. 1, Jan. 2001, pp .1-4.

V. Le Nir et al., "Reduced-Complexity Space-Time Block Coding and Decoding Schemes with Block Linear Precoding " Electronics Letters, vol. 39 No. 14, Jul. 10, 2003, pp. 1066-1068.

D. Tujkovic, "Recursive Space-Time Trellis Codes for Turbo Coded Modulation," IEEE Globecom, vol. 2, 2000, pp. 1010-1015.

S.K. Jayaweera et al., "Turbo (Iterative) Decoding of a Unitary Space-Time Code with a Convolutional Code," IEEE VTC Spring 2002, vol. 2, pp. 1020-1024.

A. Fabregas et al., "Analysis and Design of Natural and Threaded Space-Time Codes with Iterative Decoding," Conference on Signals, Systems and Computers, vol. 1, 2002 pp. 279-283.

A. Boariu et al., "A Class of Nonorthogonal Rate-One Space-Time Block Codes With Controlled Interference," IEEE Transacations on Wireless Comm., vol. 2, No. 2, Mar. 2003, pp. 270-276.

O. Tirkkonen et al., "Minimal Non-Orthogonality Rate 1 Space-Time Block Code for 3+ Tx Antennas," IEEE $6^{th}$ Int. Symp. On Spread-Spectrum Tech. & Appli., Sep. 2000, pp. 429-432.

S. Alamouti, A Simple Transmit Diversity Technique for Wireless Communications, IEEE Journal on Select Areas in Communications, vol. 16, No. 8, Oct. 1998, pp. 1451-1458.

V. Tarokh et al., "Space-Time Block Coding for Wireless Communications: Performance Results," IEEE Journal of Selected Areas in Communications, vol. 17., No. 3, Mar. 1999, pp. 451-460.

\* cited by examiner

RECEIVER AND METHOD FOR DECODING A CODED SIGNAL WITH THE AID OF A SPACE-TIME CODING MATRIX

CROSS-REFERENCE TO RELATED APPLICATION

This Application is a Section 371 National Stage Application of International Application No. PCT/FR2004/00538, filed Mar. 5, 2004 and published as WO 2005/029757 on Mar. 31, 2005, not in English.

FIELD OF DISCLOSURE

The field of the disclosure is that of wireless communications. More specifically, the disclosure relates to the reception and especially the decoding of signals received in a receiver through one or more transmission channels.

More specifically again, the disclosure relates to the iterative decoding of data encoded by means of a non-orthogonal space-time encoding matrix.

The disclosure can thus be applied especially but not exclusively to transmission systems using a plurality of antennas (at least two antennas) for emission and/or reception. Thus, the disclosure is well suited to receivers for non-orthogonal space-time codes with Nt (Nt≧2) emitter antennas Nr (Nt≧2) reception antennas based on MIMO (Multiple Inputs Multiple Outputs) and MISO (Multiple Inputs Single Output) systems.

An exemplary application of the disclosure lies in the field of radio communications, especially for systems of the third, fourth and following generations.

BACKGROUND OF THE DISCLOSURE

For such systems, beyond two emitter antennas, the 1-rate space-time codes are non-orthogonal. This is the case for example with the Tirkkonen [6] and Jafarkhani [7] codes (the references cited in the present patent application are brought together in appendix 1).

The unavoidable non-orthogonality of these codes generally results in receivers that are complex to implement, needing to use maximum likelihood decoding or of a spherical type. The complexity of implementation of these algorithms increases exponentially as a function of the number of antennas and the number of states of the modulation. The techniques for the decoding of non-orthogonal space-time codes therefore have the major drawback, in reception systems, when 1-rate space-time codes are used, of being complex in their implementation. Prior non-iterative techniques are based on the maximum likelihood (ML) criterion.

Given the present state of technological progress, they are very complicated or even impossible to make, once the number of antennas or the number of states of the modulation increases since the complexity of implementation increases exponentially with the number of states of the trellis to be processed.

In the very recent past, iterative methods associating space-time codes have been published:

In [1], Tujkovic presents recursive trellis space-time turbo-codes. Reception is done iteratively (just as in the case of turbo-codes) in using MAP (Maximum A Posteriori) decoders;

In [2], S. Jayaweera studies the concatenation of a convolutive code with a 1-rate space-time code. The decoding is done iteratively by means of MAP algorithms;

And, in [3], A. Guillen and G. Caire analyse the performance of particular space-time codes, namely natural space-time codes and threaded space-time codes. They use an iterative interference canceller to separate the contributions made by the different emitter antennas;

In [4], Bauch uses an iterative system aimed at eliminating the inter-symbol interference introduced by the different channels. The elements used in each iteration bring MAP (Maximum a posteriori) type decoders into play.

These prior art iterative techniques can be applied to certain classes of space-time codes and most of them use non-linear equalizers (or detectors) that are also complicated to implement. The performance can be improved by concatenating a convolutive channel code (or even a turbo-code) with the space-time code at emission.

Boariu and M. Ionescu [5] present a class of minimal interference quasi-orthogonal space-time block codes. These codes can be decoded by an iterative interference cancellation method.

The technique presented in [5] is limited to four antennas with (4-state) QPSK modulation and a rate equal to 1. There are many approaches in which it cannot be implemented efficiently and in a way that it performs well, for example in a CDMA type of system. Furthermore, the adapted MRC (Maximum Ratio Combining) filter performs poorly with codes of types other than the one proposed.

Moreover, Boariu's approach assumes that the matrix used is of the same size as the space-time code.

SUMMARY

An embodiment of the present invention is directed to a method for the decoding of a received signal comprising symbols distributed in space, time and/or frequency by means especially of a space-time or space-frequency encoding matrix, and implementing a space-time decoding step and at least one iteration (advantageously at least two iterations), each iteration comprising the following sub-steps:

diversity pre-decoding, which is the inverse of a diversity pre-encoding carried out when said signal is emitted, delivering pre-decoded data;

estimation of the symbols forming said signal, from said pre-decoded data, delivering estimated symbols;

diversity pre-encoding identical to said diversity pre-encoding implemented at emission, applied to said estimated symbols, to give an estimated signal.

The approach of one or more embodiments the invention thus makes use of a diversity pre-encoding to optimize the quality of the decoding. To this end, during each of the iterations, a corresponding pre-decoding is performed, the symbols are estimated and then a pre-encoding is repeated on these estimated symbols.

Said pre-encoding can be obtained especially by one of the following methods:

spread-spectrum techniques;
linear pre-encoding.

Thus, an embodiment of the invention can be applied to all systems implementing an OFDM, CDMA, MC-CDMA or similar technique, or again a linear pre-decoding as described in [10].

According to an advantageous embodiment of the invention, the method implements an automatic gain control step before or after said equalization step and/or during at least one of said iterations.

The method of an embodiment of the invention may advantageously include a channel-decoding step, symmetrical with a channel-encoding step implemented at emission.

This channel-decoding step may implement especially a turbo-decoding operation, if necessary with a variable number of turbo-decoding iterations within each of the iterations of the invention.

According to an advantageous variant, implementing a channel encoding operation, the method comprises the following steps:

diagonalization, obtained from a total encoding/channel/decoding matrix taking account of at least said encoding matrix, of a decoding matrix, corresponding to the matrix that is the conjugate transpose of said encoding matrix;

demodulation, symmetrical with a modulation implemented at emission;

de-interlacing, symmetrical with an interlacing implemented at emission;

channel decoding, symmetrical with a channel encoding implemented at emission;

re-interlacing, identical with the one implemented at emission;

re-modulation, identical with the one implemented at emission, delivering an estimated signal;

at least one iteration of an interference cancellation step comprising a subtraction from an equalized signal of said estimated signal multiplied by an interference matrix, delivering an optimized signal.

The method may also comprise at least one de-interlacing step and at least one re-interlacing step, corresponding to an interlacing implemented at emission.

Advantageously, it may also comprise a step of improvement of a channel estimation, taking account of the data estimated during at least one of said iterations.

Advantageously, the decoding method comprises the following steps:

space-time decoding, which is the inverse of the space-time encoding implemented at emission, delivering a decoded signal;

equalization of said decoded signal, delivering an equalized signal;

diagonalization, by multiplication of said equalized signal by a matrix leading to a total diagonal encoding/channel/decoding matrix taking account of at least said encoding matrix, of a decoding matrix, corresponding to the matrix that is the conjugate transpose of said encoding matrix;

diversity pre-decoding, which is the inverse of a diversity pre-encoding implemented at emission of said signal, delivering pre-decoded data;

estimation of the symbols forming said signal, from said pre-decoded data, delivering estimated symbols;

diversity pre-encoding, identical to said diversity pre-encoding implemented at emission, applied to said estimated symbols, to give an estimated signal;

at least one iteration of an interference cancellation step implementing the following sub-steps:

subtraction, from said equalized signal, of said estimated signal multiplied by an interference matrix, delivering an optimized signal;

diversity pre-decoding of said optimized signal, that is the inverse of a diversity pre-encoding implemented at emission of said signal, delivering pre-decoded data;

estimation of the symbols forming said optimized signal, from pre-decoded data, delivering new estimated symbols;

diversity pre-encoding (except for the last iteration), identical to said diversity pre-encoding implemented at emission, applied to said new estimated symbols to give a new estimated signal, except for the last iteration.

Thus, efficiency greater than that of known techniques is obtained with an approach applicable to all the space-time block codes.

An embodiment of invention also relates to a single-iteration system comprising only the following sub-steps:

space-time decoding, which is the inverse of the space-time encoding implemented at emission, delivering a decoded signal;

equalization of said decoded signal, delivering an equalized signal;

diagonalization, by multiplication of said equalized signal by a matrix leading to a total diagonal encoding/channel/decoding matrix taking account of at least said encoding matrix, of a decoding matrix, corresponding to the matrix that is the conjugate transpose of said encoding matrix;

diversity pre-decoding, which is the inverse of a diversity pre-encoding implemented at emission of said signal, delivering pre-decoded data;

estimation of the symbols forming said signal, from said pre-decoded data, delivering estimated symbols.

For certain systems, the sub-steps are indeed sufficient to obtain acceptable gain. Thus, efficiency greater than that of known techniques is obtained with an approach applicable to all the space-time block codes.

In particular embodiments, said space-time decoding and equalization steps and/or said equalization and conversion steps may be done jointly.

According to an advantageous characteristic, said encoded symbols are emitted by means of at least two antennas. The receiver then takes account comprehensively of the different corresponding transmission channels.

An embodiment of invention can also be applied to a system with only one emitter antenna. The number of reception antennas may also be variable.

Preferably, said equalization step implements an equalization according to one of the techniques belonging to the group comprising:

MMSE type equalization;
EGC type equalization;
ZF type equalization;
equalization taking account of a piece of information representing the signal-to-noise ratio between the received signal and the reception noise.

These techniques are well known in other applications.

It will be noted that the implementation of an equalization, and not an adaptive filtering as proposed by Boariu, gives greater efficiency.

According to an advantageous embodiment, said steps of symbol estimation implement a soft decision, associating a piece of confidence information with a decision and said subtraction step or steps take account of said pieces of confidence information.

Naturally, it is also possible to implement a hard decision.

It is also possible to integrate the equalization step into the diagonalization step. In this case, the diagonalized signal is equal to the decoded signal multiplied by the inverse matrix of the sum of the total encoding/channel/decoding matrix and of the matrix of variance of noise.

Advantageously, said received signal is a multicarrier signal, the receiver comprising corresponding processing means. With pre-encoding and OFDM, the encoding becomes a space-time-frequency encoding.

In certain embodiments, said space-time code may have a rate different from 1.

Advantageously, said method implements an automatic gain control step before or after said equalization step and/or during said iterations.

According to a first particular embodiment, said received signal being transmitted by means of four antennas, said total matrix has a value:

$$G = \gamma \begin{bmatrix} A & 0 & 0 & J \\ 0 & A & -J & 0 \\ 0 & -J & A & 0 \\ J & 0 & 0 & A \end{bmatrix}$$

with:

$$A = |h_1|^2 + |h_2|^2 + |h_3|^2 + |h_4|^2$$

$J = 2Re\{h_1 h^*_4 - h_2 h^*_3\}$, representing the interference, and $$\gamma = \frac{1}{|h_1|^2 + |h_2|^2 + |h_3|^2 + |h_4|^2 + \frac{1}{SNR}}$$

where:

$$H = \begin{bmatrix} h_1 & h_2 & h_3 & h_4 \\ -h^*_2 & h^*_1 & -h^*_4 & h^*_3 \\ -h^*_3 & -h^*_4 & h^*_1 & h^*_2 \\ h_4 & -h_3 & -h_2 & h_1 \end{bmatrix}$$

is a matrix grouping the space-time encoding and the transmission channel, and SNR represents the signal-to-noise ratio.

According to another particular embodiment, said received signal being transmitted by means of eight antennas, said total matrix has a value:

$$G = \gamma \cdot H^H \cdot H = \gamma \begin{bmatrix} A & 0 & 0 & 0 & J & 0 & 0 & 0 \\ 0 & A & 0 & 0 & 0 & J & 0 & 0 \\ 0 & 0 & A & 0 & 0 & 0 & J & 0 \\ 0 & 0 & 0 & A & 0 & 0 & 0 & J \\ J & 0 & 0 & 0 & A & 0 & 0 & 0 \\ 0 & J & 0 & 0 & 0 & A & 0 & 0 \\ 0 & 0 & J & 0 & 0 & 0 & A & 0 \\ 0 & 0 & 0 & J & 0 & 0 & 0 & A \end{bmatrix}$$

with $$A = |h_1|^2 + |h_2|^2 + |h_3|^2 + |h_4|^2 + |h_5|^2 + |h_6|^2 + |h_7|^2 + |h_8|^2$$

and $$J = 2\mathrm{Im}\{h_1 h^*_5 + h_2 h^*_6 + h_3 h^*_7 + h_4 h^*_8\}$$

and $$\gamma = \frac{1}{|h_1|^2 + |h_2|^2 + |h_3|^2 + |h_4|^2 + |h_5|^2 + |h_6|^2 + |h_7|^2 + |h_8|^2 + \frac{1}{SNR}}$$

where:

$$H = \begin{bmatrix} h_1 & h_2 & h_3 & h_4 & h_5 & h_6 & h_7 & h_8 \\ h_2 & -h_1 & h_4 & -h_3 & h_6 & -h_5 & h_8 & -h_7 \\ h_3 & -h_4 & -h_1 & h_2 & h_7 & -h_8 & -h_5 & h_6 \\ h_4 & h_3 & -h_2 & -h_1 & h_8 & h_7 & -h_6 & -h_5 \\ h^*_1 & h^*_2 & h^*_3 & h^*_4 & h^*_5 & h^*_6 & h^*_7 & h^*_8 \\ h^*_2 & -h^*_1 & h^*_4 & -h^*_3 & h^*_6 & -h^*_5 & h^*_8 & -h^*_7 \\ h^*_3 & -h^*_4 & -h^*_1 & h^*_2 & h^*_7 & -h^*_8 & -h^*_5 & h^*_6 \\ h^*_4 & h^*_3 & -h^*_2 & -h^*_1 & h^*_8 & h^*_7 & -h^*_6 & -h^*_5 \\ h_5 & h_6 & h_7 & h_8 & h_1 & h_2 & h_3 & h_4 \\ h_6 & -h_5 & h_8 & -h_7 & h_2 & -h_1 & h_4 & -h_3 \\ h_7 & -h_8 & -h_5 & h_6 & h_3 & -h_4 & -h_1 & h_2 \\ h_8 & h_7 & -h_6 & -h_5 & h_4 & h_3 & -h_2 & -h_1 \\ h^*_5 & h^*_6 & h^*_7 & h^*_8 & h^*_1 & h^*_2 & h^*_3 & h^*_4 \\ h^*_6 & -h^*_5 & h^*_8 & -h^*_7 & h^*_2 & -h^*_1 & h^*_4 & -h^*_3 \\ h^*_7 & -h^*_8 & -h^*_5 & h^*_6 & h^*_3 & -h^*_4 & -h^*_1 & h^*_2 \\ h^*_8 & h^*_7 & -h^*_6 & -h^*_5 & h^*_4 & h^*_3 & -h^*_2 & -h^*_1 \end{bmatrix}$$

is a matrix grouping together the space-time coding and the transmission channel and SNR represents the signal-to-noise ratio.

An embodiment of invention also relates to a method of encoding and decoding, according to which the encoding implements a space-time encoding matrix such as:

$$H = \begin{bmatrix} h_1 & h_2 & h_3 & h_4 & h_5 & h_6 & h_7 & h_8 \\ h_2 & -h_1 & h_4 & -h_3 & h_6 & -h_5 & h_8 & -h_7 \\ h_3 & -h_4 & -h_1 & h_2 & h_7 & -h_8 & -h_5 & h_6 \\ h_4 & h_3 & -h_2 & -h_1 & h_8 & h_7 & -h_6 & -h_5 \\ h^*_1 & h^*_2 & h^*_3 & h^*_4 & h^*_5 & h^*_6 & h^*_7 & h^*_8 \\ h^*_2 & -h^*_1 & h^*_4 & -h^*_3 & h^*_6 & -h^*_5 & h^*_8 & -h^*_7 \\ h^*_3 & -h^*_4 & -h^*_1 & h^*_2 & h^*_7 & -h^*_8 & -h^*_5 & h^*_6 \\ h^*_4 & h^*_3 & -h^*_2 & -h^*_1 & h^*_8 & h^*_7 & -h^*_6 & -h^*_5 \\ h_5 & h_6 & h_7 & h_8 & h_1 & h_2 & h_3 & h_4 \\ h_6 & -h_5 & h_8 & -h_7 & h_2 & -h_1 & h_4 & -h_3 \\ h_7 & -h_8 & -h_5 & h_6 & h_3 & -h_4 & -h_1 & h_2 \\ h_8 & h_7 & -h_6 & -h_5 & h_4 & h_3 & -h_2 & -h_1 \\ h^*_5 & h^*_6 & h^*_7 & h^*_8 & h^*_1 & h^*_2 & h^*_3 & h^*_4 \\ h^*_6 & -h^*_5 & h^*_8 & -h^*_7 & h^*_2 & -h^*_1 & h^*_4 & -h^*_3 \\ h^*_7 & -h^*_8 & -h^*_5 & h^*_6 & h^*_3 & -h^*_4 & -h^*_1 & h^*_2 \\ h^*_8 & h^*_7 & -h^*_6 & -h^*_5 & h^*_4 & h^*_3 & -h^*_2 & -h^*_1 \end{bmatrix}$$

and the decoding is a decoding as described here above.

An embodiment of invention also relates to receivers implementing decoding means that carry out the method described here above.

Other features and advantages of one or more embodiments of the invention shall appear more clearly from the following description of a preferred embodiment of the invention, given by way of a simple illustrative and non-restrictive example, and from the appended drawings.

DETAILED DESCRIPTION OF ILLUSTRATIVE EMBODIMENTS

An embodiment of invention therefore proposes a novel approach to the decoding of space-time codes that is more efficient and simpler to implement. For this purpose, it proposes especially to implement, at the encoding stage, a diversity pre-encoding (by spread-spectrum or linear pre-encoding methods), and iterative processing at reception. According to the embodiment, a decoding and then a re-encoding corresponding to this pre-encoding are performed at each iteration. This gives an increasingly precise estimation of the symbols emitted and provides for the increasingly efficient elimination of transmission-caused interference from the received signal.

The first iteration is a particular one: it includes a diagonalization (as the total matrix is not originally diagonal). It is preceded by an equalization of the received signal.

The following iterations are all identical: the estimation is refined by subtracting the effects of the interference as and when required.

To facilitate an understanding of an embodiment of the invention, we shall first of all rapidly present the known approach of Jafarkhani (§1), and then the iterative approach, without the use of a pre-encoding for a four-antenna code (§2), then two eight-antenna codes, respectively a known code (§3) and a new code (§4). Then we should present two examples of decoding of embodiments of the invention, respectively using a linear pre-encoding (§5) and a spread-spectrum encoding (§6).

1. Jafarkhani's Approach

1.1 Introduction

This space-time code with four emitter antennas and one reception antenna and with rate 1 was introduced by H. Jafarkhani in [7].

Figure 1:
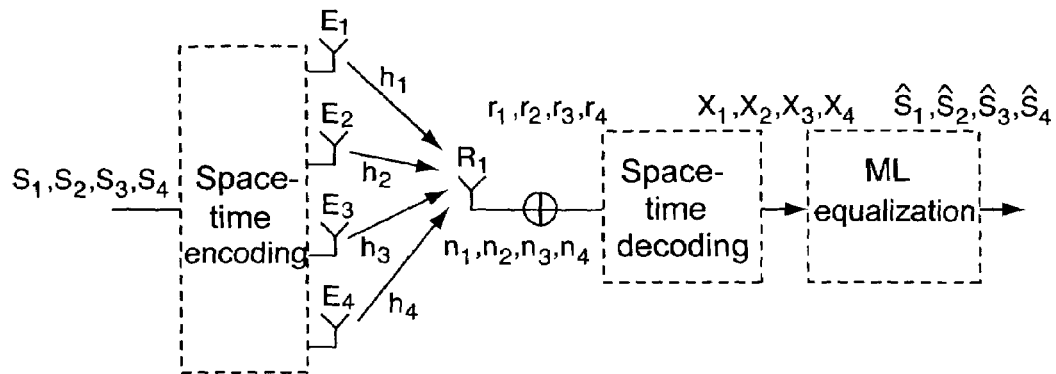
FIG. 1 presents Jafarkhani's encoding and decoding principle, known per se.

For digital modulation with M phase states, FIG. 1 describes the communication scheme comprising four emitter antennas, E1, E2, E3 and E4 and one reception antenna R1. The four propagation channels, namely E1-R1, E2-R1, E3-R1 and E4-R1, are considered to be without inter-symbol interference (flat fading) and constant during four consecutive emission intervals, IT1, IT2, IT3 and IT4.

Their respective complex fading coefficients are called h1, h2, h3 and h4. It is assumed here that the hi values follow an independent Rayleigh law for each of them.

The terms s1, s2, s3 and s4 designate the complex symbols emitted respectively during the time intervals IT1, IT2, IT3 and IT4. The symbols received during these same time intervals are called r1, r2, r3 and r4. The thermal noise introduced by the reception antenna is represented by the samples n1, n2, n3 and n4.

1.2 Emission

Jafarkhani encoding consists of the emission, in the four time intervals IT1, IT2, IT3 and IT4 and on the different emitter antennas, of the symbols presented in the following table:

|  | IT1 | IT2 | IT3 | IT4 |
| --- | --- | --- | --- | --- |
| Antenna E1 | $s_1$ | $-s_2^*$ | $-s_3^*$ | $s_4$ |
| Antenna E2 | $s_2$ | $s_1^*$ | $-s_4^*$ | $-s_3$ |
| Antenna E3 | $s_3$ | $-s_4^*$ | $s_1^*$ | $-s_2$ |
| Antenna E4 | $s_4$ | $s_3^*$ | $s_2^*$ | $s_1$ |

(.)* represents the complex conjugation operator.

1.3 Reception

In reception according to FIG. 1, the following signals are obtained on the antenna R1:

during IT1: $r_1 = h_1 s_1 + h_2 s_2 + h_3 s_3 + h_4 s_4 + n_1$ during IT2: $r_2 = -h_1 s_2^* + h_2 s_1^* - h_3 s_4^* + h_4 s_3^* + n_2$ during IT3: $r_3 = -h_1 s_3^* - h_2 s_4^* + h_3 s_1^* + h_4 s_2^* + n_3$ during IT4: $r_4 = h_1 s_4 - h_2 s_3 - h_3 s_2 + h_4 s_1 + n_4$ An equivalent matrix representation is written as follows:

$$\tilde{r} = Hs + n$$

with $$\tilde{r} = \begin{bmatrix} r_1 \\ -r_2^* \\ -r_3^* \\ r_4 \end{bmatrix}, H = \begin{bmatrix} h_1 & h_2 & h_3 & h_4 \\ -h_2^* & h_1^* & -h_4^* & h_3^* \\ -h_3^* & -h_4^* & h_1^* & h_2^* \\ h_4 & -h_3 & -h_2 & h_1 \end{bmatrix}, s = \begin{bmatrix} s_1 \\ s_2 \\ s_3 \\ s_4 \end{bmatrix} \text{ et } n = \begin{bmatrix} n_1 \\ n_2 \\ n_3 \\ n_4 \end{bmatrix}$$

The overall rate of the encoding is equal to 1.

It is assumed, during reception, that there is exact knowledge of the states of the channels $h_1$, $h_2$, $h_3$ and $h_4$. The decoding is then done as follows:

during IT1: $x_1 = h^*_1 r_1 + h_2 r^*_2 + h_3 r^*_3 + h^*_4 r_4$
during IT2: $x_2 = h^*_2 r_1 - h_1 r^*_2 + h_4 r^*_3 - h^*_3 r_4$
during IT3: $x_3 = h^*_3 r_1 + h_4 r^*_2 - h_1 r^*_3 - h^*_2 r_4$
during IT4: $x_4 = h^*_4 r_1 - h_3 r^*_2 - h_2 r^*_3 + h^*_1 r_4$ According to the matrix representation, the decoding is done by the application of the matrix $H^H$, where the operator H signifies the conjugate transpose.

$$x = H^H \tilde{r} = H^H H s + n'$$

with $$n' = \begin{bmatrix} h^*_1 n_1 + h_2 n^*_2 + h_3 n^*_3 + h^*_4 n_4 \\ h^*_2 n_1 - h_1 n^*_2 + h_4 n^*_3 + h^*_3 n_4 \\ h^*_3 n_1 + h_4 n^*_2 - h_1 n^*_3 - h^*_2 n_4 \\ h^*_4 n_1 - h_3 n^*_2 - h_2 n^*_3 + h^*_1 n_4 \end{bmatrix}$$

and $$x = \begin{bmatrix} x_1 \\ x_2 \\ x_3 \\ x_4 \end{bmatrix}$$

In taking the matrix product, we get:

$$x = \begin{bmatrix} A & 0 & 0 & J \\ 0 & A & -J & 0 \\ 0 & -J & A & 0 \\ J & 0 & 0 & A \end{bmatrix} s + n'$$

with $$A = |h_1|^2 + |h_2|^2 + |h_3|^2 + |h_4|^2$$

and $$J = 2\text{Re}\{h_1 h^*_4 - h_2 h^*_3\}$$

We posit $$G = \begin{bmatrix} A & 0 & 0 & J \\ 0 & A & -J & 0 \\ 0 & -J & A & 0 \\ J & 0 & 0 & A \end{bmatrix}$$

which shall be called the total encoding/channel/decoding matrix.

The terms of the diagonal, A, follow a $\chi_2^8$ law. The diversity is therefore maximal. However, the interfering terms J make the performance of a direct linear detection sub-optimal. The author therefore proposes a Maximum Likelihood (ML) detection. This detection is cumbersome and complicated to implement.

Jafarkhani's encoding presented here above can therefore be used to exploit the diversity given by the four emitter antennas. However, unlike the two-antenna Alamouti encoding [8], interfering terms Jr remain in the total matrix. These terms make the encoding sub-optimal and necessitate the use, in reception, of an ML detection algorithm that is a complex in its implementation.

2. Iterative Approach

Four-Antenna Example

Figure 2:
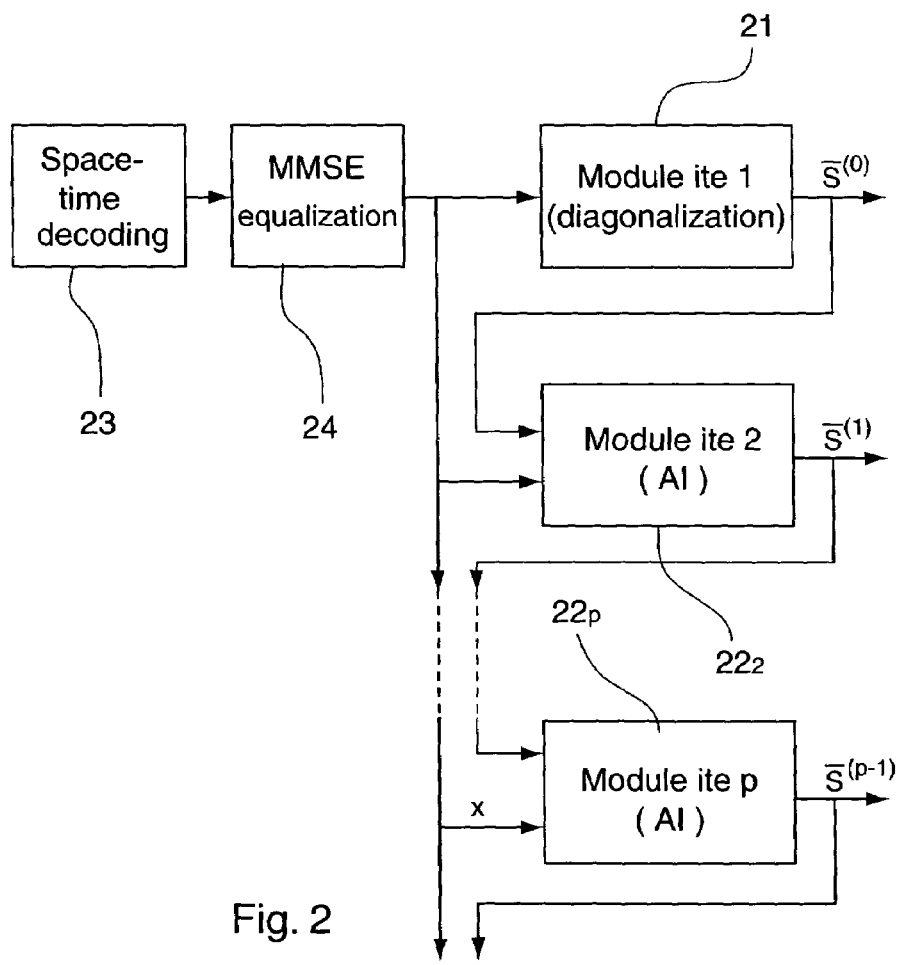
FIG. 2 illustrates the iterative general structure of the decoding.

One of the aspects of an embodiment of the present invention is that it cancels out the interfering terms iteratively through a priori knowledge of the signal emitted. To do this, two modules are used as illustrated in FIG. 2:

at initialization (iteration 1), the first module 21 (called a diagonalization module) is used to estimate the emitted signal for a first time.

from the second iteration $22_2$ onwards and until the last iteration $22_p$: a second module (called an interference cancellation module) is aimed at the deduction, from the received signal, of the interfering terms reconstructed by means of a priori knowledge of the signal emitted, given by the preceding iteration.

The space-time decoding 23 used is the one presented here above.

During the MMSE equalization 24, the signal is multiplied by the factor $$\gamma = \frac{1}{|h_1|^2 + |h_2|^2 + |h_3|^2 + |h_4|^2 + \frac{1}{SNR}}$$

where SNR is the signal-to-noise ratio. The matrix G is therefore multiplied by $\gamma$.

2.1 $1^{st}$ Iteration

Diagonalization of the Matrix G4

Figure 3:
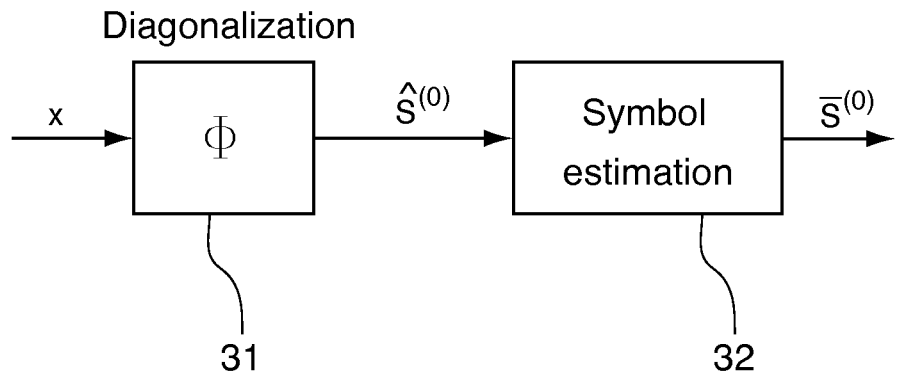
FIG. 3 presents the first iteration of the scheme of FIG. 2.

The first iteration 21, illustrated in FIG. 3, is different from the following iterations. It consists in multiplying the signal by a matrix so that, on the whole, the matrix is diagonal. For this purpose, first of all the matrix G is diagonalized (31). This operation is performed simply by the matrix multiplication of G by a diagonalization matrix $\Phi$ which, apart from one factor, is the co-matrix of G.

$$G = \gamma \begin{bmatrix} A & 0 & 0 & J \\ 0 & A & -J & 0 \\ 0 & -J & A & 0 \\ J & 0 & 0 & A \end{bmatrix}$$

with $\Phi = \begin{bmatrix} A & 0 & 0 & -J \\ 0 & A & J & 0 \\ 0 & J & A & 0 \\ -J & 0 & 0 & A \end{bmatrix}$ we obtain $G_{diag} = \Phi \cdot G$ $$= \gamma \begin{bmatrix} A^2 - J^2 & 0 & 0 & 0 \\ 0 & A^2 - J^2 & 0 & 0 \\ 0 & 0 & A^2 - J^2 & 0 \\ 0 & 0 & 0 & A^2 - J^2 \end{bmatrix}$$

It is noted that the operation of diagonalization of the matrix G amounts to a linear combination of the samples $x_i$, and is therefore very simple to implement.

We thus obtain:

$$x_{diag} = \Phi \cdot x$$

$$= \gamma \begin{bmatrix} A^2 - J^2 & 0 & 0 & 0 \\ 0 & A^2 - J^2 & 0 & 0 \\ 0 & 0 & A^2 - J^2 & 0 \\ 0 & 0 & 0 & A^2 - J^2 \end{bmatrix} s + n''$$

with $n'' = \Phi n'$

Since the matrix $G_{diag}$ is diagonal, a linear detection 32 is possible. However, the terms of the diagonal no longer follow a $\Phi_2^8$ law, and the diversity is therefore no longer exploited optimally.

However, an estimate is obtained of the symbol vector which shall be called $$\hat{s}^{(0)} = \begin{bmatrix} \hat{s}_1^{(0)} \\ \hat{s}_2^{(0)} \\ \hat{s}_3^{(0)} \\ \hat{s}_4^{(0)} \end{bmatrix}.$$

Figure 5:
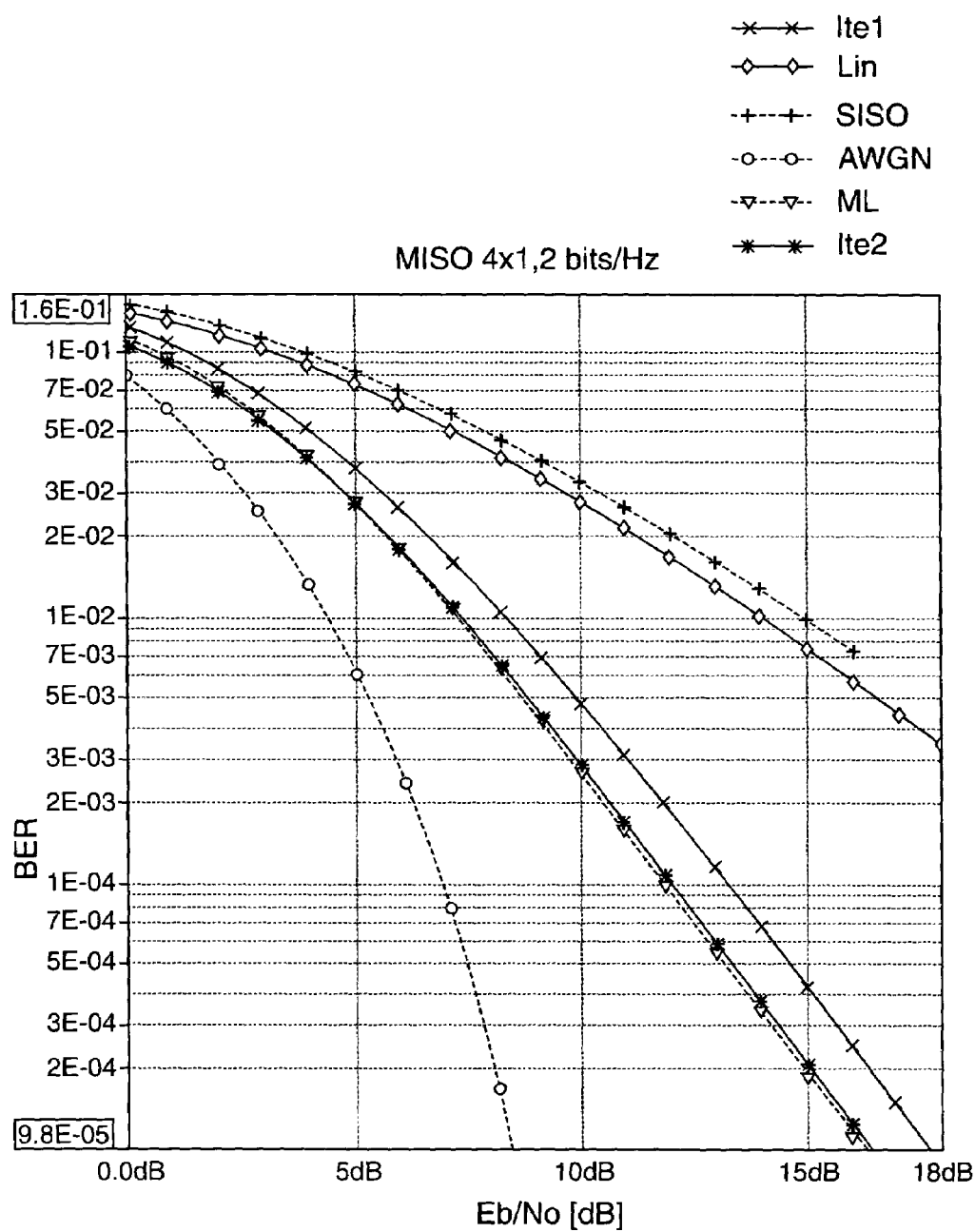
FIG. 5 illustrates the performance of the iterative approach as compared with those of the decoding of FIG. 1.

It will be noted, on the performance curves of FIG. 5, that this estimate is better than an estimate made without diagonalization.

The symbols are converted into packets of bits (for example by a demodulation operation with hard decision: the point of the constellation closest to the symbol considered is sought) and $$\bar{b}^{(0)} = \begin{bmatrix} \bar{b}_1^{(0)} \\ \bar{b}_2^{(0)} \\ \bar{b}_3^{(0)} \\ \bar{b}_4^{(0)} \end{bmatrix}$$

is obtained, where $\bar{b}_i^{(0)}$ represents a vector of bits with a length $2^M$.

Lastly, a modulation operation is performed on $\bar{b}^{(0)}$ to obtain $\bar{s}^{(0)}$, "decided" symbol vectors. These symbols will be used at the next iteration.

2.2 Itération p (p>1)

Cancellation of Interference

Figure 4:
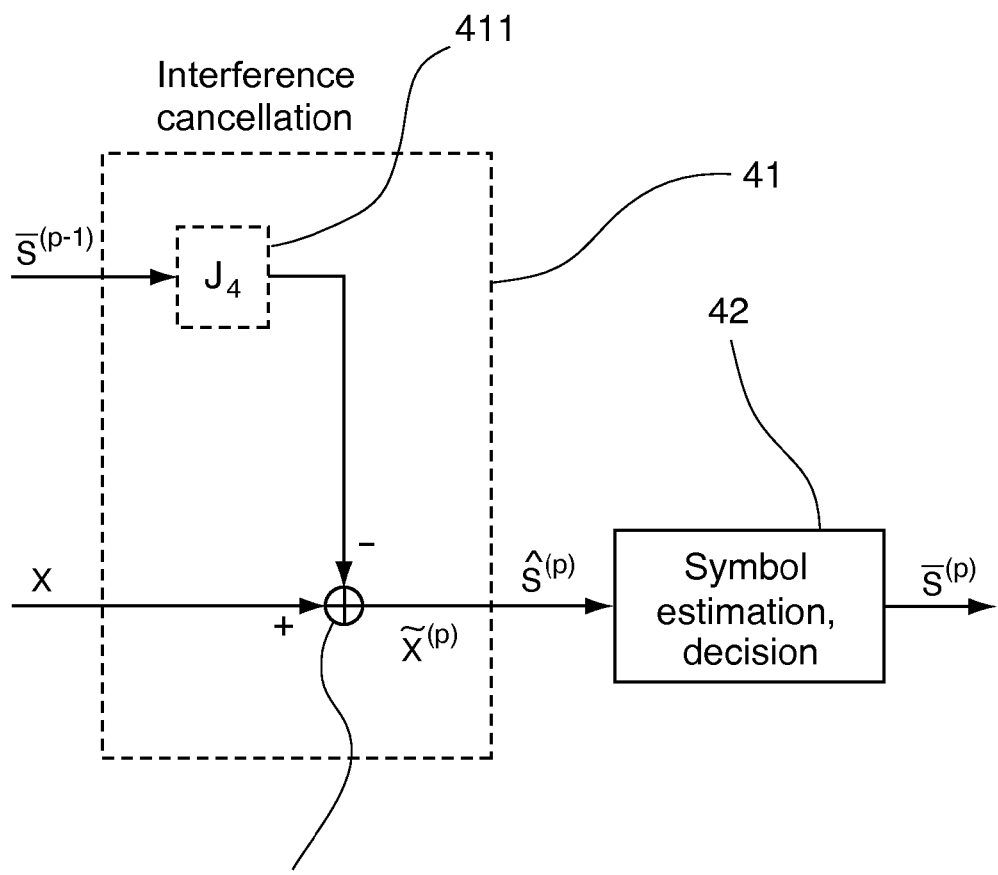
FIG. 4 presents the structure of the following iterations of the scheme of FIG. 2.

Pieces of data decided at the preceding iteration $\bar{s}^{(p-1)}$ are then available. An iteration is illustrated in FIG. 4.

An interference matrix $J_4$ 411 is built:

$$J_4 = \gamma \begin{bmatrix} 0 & 0 & 0 & J \\ 0 & 0 & -J & 0 \\ 0 & -J & 0 & 0 \\ J & 0 & 0 & 0 \end{bmatrix}$$

The cancellation of interference 41 is done by subtraction 412 of the result of the multiplication 411 by $J_4$ from the output of the equalizer 24, as follows:

$$\tilde{x}^{(p)} = x - J_4 \bar{s}^{(p-1)}$$

$$\tilde{x}^{(p)} = \gamma \begin{bmatrix} A & 0 & 0 & J \\ 0 & A & -J & 0 \\ 0 & -J & A & 0 \\ J & 0 & 0 & A \end{bmatrix} s + n' - \gamma \begin{bmatrix} 0 & 0 & 0 & -J \\ 0 & 0 & -J & 0 \\ 0 & -J & 0 & 0 \\ J & 0 & 0 & 0 \end{bmatrix} \bar{s}^{(p-1)}$$

If $\bar{s}^{(p-1)}$ is a good approximation of s, it is seen that the interfering terms are practically cancelled out in the matrix G.

The matrix thus becomes diagonal and a symbol estimation 42 by linear detection is possible. By performing the same operations of equalization, demodulation and detection as in the case of the iteration 1, we obtain a new estimation of s: $\bar{s}^{(p)}$.

2.3 Results

FIG. 5 presents the performance of the system described here above for a four-state modulation (QPSK), without encoding (spectral efficiency=2 bits/Hz). The Rayleigh channels are considered to be white (not filtered).

The curve entitled SISO shows the performance of a system with one emitter antenna and one reception antenna. This system benefits from no spatial diversity. It is therefore a minimal limit.

The curve Lin gives the performance of the linearly detected Jafarkhani system (matrix G), while the curve ML represents the binary error rate of the same system detected by the ML algorithm.

The curves named ite1 and ite2 represent the performance of the first two iterations of our system (the system converges from the iteration 2 onwards).

It is noted that ite2 is indistinguishable from the Jafarkhani ML. It has therefore been possible, for lower complexity, to successfully obtain the same performance as a maximum likelihood algorithm.

It will also be noted that it is possible to improve the system by adding encoding i.e. replacing simple modulation by an encoded modulation (convolutive encoder, interlacer and modulation). In reception, it suffices to replace the hard decision demodulator by a soft decision demodulator followed by an interlacer and a channel decoder. By keeping the soft information, the symbol emitted is reconstructed by again applying the encoded modulation stage.

3. Eight Emitter Antenna Scheme with ¾ Rate

The code used was introduced by H. Jafarkhani in [7]. Eight emitter antennas, E1, E2, E3, E4, E5, E6, E7, E8 and one reception antenna R1 are considered. The result of this is eight propagation channels (again without inter-symbol interference): h1, h2, h3, h4, h5, h6, h7, h8.

The complex symbols to be emitted are denoted by s1, s2, s3, s4, s5 and s6 and there are eight emission time intervals available, IT1, IT2, IT3, IT4, IT5, IT6, IT7 and IT8, during which the contributions hi are assumed to be constant.

3.1 Emission

The following is the emission scheme:

|            | IT1   | IT2      | IT3      | IT4      | IT5   | IT6      | IT7      | IT8      |
|------------|-------|----------|----------|----------|-------|----------|----------|----------|
| Antenna E1 | $s_1$ | $-s_2^*$ | $s_3^*$  | 0        | $-s_4$| $-s_5^*$ | $s_6^*$  | 0        |
| Antenna E2 | $s_2$ | $s_1^*$  | 0        | $-s_3^*$ | $-s_5$| $s_4^*$  | 0        | $s_6^*$  |
| Antenna E3 | $s_3$ | 0        | $-s_1^*$ | $s_2^*$  | $-s_6$| 0        | $-s_4^*$ | $-s_5^*$ |
| Antenna E4 | 0     | $-s_3$   | $-s_2$   | $-s_1$   | 0     | $s_6$    | $s_5$    | $-s_4$   |
| Antenna E5 | $s_4$ | $s_5^*$  | $-s_6^*$ | 0        | $s_1$ | $-s_2^*$ | $s_3^*$  | 0        |
| Antenna E6 | $s_5$ | $-s_4^*$ | 0        | $s_6^*$  | $s_2$ | $s_1^*$  | 0        | $s_3^*$  |
| Antenna E7 | $s_6$ | 0        | $s_4^*$  | $-s_5^*$ | $s_3$ | 0        | $-s_1^*$ | $-s_2^*$ |
| Antenna E8 | 0     | $s_6$    | $s_5$    | $s_4$    | 0     | $s_3$    | $s_2$    | $s_1$    |

(.)* represents the complex conjugation operator.

It is noted that the rate of this code is ¾.

During the eight time intervals, the following samples are received:

$$r_n = \sum_{i=1}^{8} S_{i,n}^T \cdot h_i + n_n$$

with $1 \leq i \leq 8$, $1 \leq n \leq 8$ and S the matrix of mapping corresponding to the here above emission scheme.

In overlooking the noise, an equivalent matrix representation is written as follows:

$$\tilde{r} = Hs$$

with $$H = \begin{bmatrix} h_1 & h_2 & h_3 & h_5 & h_6 & h_7 \\ 0 & 0 & -h_4 & 0 & 0 & h_8 \\ h_2^* & -h_1^* & 0 & -h_6^* & h_5^* & 0 \\ 0 & -h_4 & 0 & 0 & h_8 & 0 \\ -h_3^* & 0 & h_1^* & h_7^* & 0 & -h_5^* \\ -h_4 & 0 & 0 & h_8 & 0 & 0 \\ 0 & h_3^* & -h_2^* & 0 & -h_7^* & h_6^* \\ h_5 & h_6 & h_7 & -h_1 & -h_2 & -h_3 \\ 0 & 0 & h_8 & 0 & 0 & h_4 \\ h_6^* & -h_5^* & 0 & h_2^* & -h_1^* & 0 \\ 0 & h_8 & 0 & 0 & h_4 & 0 \\ -h_7^* & 0 & h_5^* & -h_3^* & 0 & h_1^* \\ -h_8 & 0 & 0 & -h_4 & 0 & 0 \\ 0 & -h_7^* & h_6^* & 0 & -h_3^* & h_2^* \end{bmatrix},$$

$$s = \begin{bmatrix} s_1 \\ s_2 \\ s_3 \\ s_4 \\ s_5 \\ s_6 \end{bmatrix} \text{ and}$$

$$\tilde{r} = \begin{bmatrix} r_1 \\ r_2 \\ r_2^* \\ r_3 \\ r_3^* \\ r_4 \\ r_4^* \\ r_5 \\ r_6 \\ r_6^* \\ r_7 \\ r_7^* \\ r_8 \\ r_8^* \end{bmatrix}$$

3.2 Reception

When decoding, the matrix $H^H$ is applied, followed by an MMSE equalization coefficient $\gamma$:

$$x = \gamma \cdot H^H \cdot \tilde{r} = \gamma \cdot H^H H \cdot s$$

and the following total matrix is obtained:

$$G = \gamma \cdot H^H \cdot H = \gamma \begin{bmatrix} A & 0 & 0 & -J & 0 & 0 \\ 0 & A & 0 & 0 & -J & 0 \\ 0 & 0 & A & 0 & 0 & -J \\ J & 0 & 0 & A & 0 & 0 \\ 0 & J & 0 & 0 & A & 0 \\ 0 & 0 & J & 0 & 0 & A \end{bmatrix}$$

with $A = |h_1|^2 + |h_2|^2 + |h_3|^2 + |h_4|^2 + |h_5|^2 + |h_6|^2 + |h_7|^2 + |h_8|^2$ $J = 2\mathrm{Im}\{h_1 h_5^* + h_2 h_6^* + h_3 h_7^* + h_4 h_8^*\}$ and $\gamma = \dfrac{1}{|h_1|^2 + |h_2|^2 + |h_3|^2 + |h_4|^2 + |h_5|^2 + |h_6|^2 + |h_7|^2 + |h_8|^2 + \dfrac{1}{SNR}}$ It is noted that A follows a $\chi_2^8$ law ($8^{th}$ order diversity).

Just as in the four-antenna case, the decoding can be subdivided into two steps:

3.2.1 Diagonalization

The operation of diagonalization is performed by applying the matrix $\Phi$:

$$\Phi = \begin{bmatrix} A & 0 & 0 & J & 0 & 0 \\ 0 & A & 0 & 0 & J & 0 \\ 0 & 0 & A & 0 & 0 & J \\ -J & 0 & 0 & A & 0 & 0 \\ 0 & -J & 0 & 0 & A & 0 \\ 0 & 0 & -J & 0 & 0 & A \end{bmatrix}$$

We obtain:

$$G_{diag} = \Phi \cdot G =$$

-continued $$\gamma \begin{bmatrix} A^2+J^2 & 0 & 0 & 0 & 0 & 0 \\ 0 & A^2+J^2 & 0 & 0 & 0 & 0 \\ 0 & 0 & A^2+J^2 & 0 & 0 & 0 \\ 0 & 0 & 0 & A^2+J^2 & 0 & 0 \\ 0 & 0 & 0 & 0 & A^2+J^2 & 0 \\ 0 & 0 & 0 & 0 & 0 & A^2+J^2 \end{bmatrix}$$

A linear detection is therefore possible: we obtain $\hat{s}^{(0)}$, then after decision $\bar{s}^{(0)}$.

3.2.2 Cancellation of Interference

The interference phenomena are reconstructed by multiplying the vector $\bar{s}^{(p-1)}$ of the data estimated at the preceding step by the matrix $J_6$:

$$J_6 = \gamma \begin{bmatrix} 0 & 0 & 0 & -J & 0 & 0 \\ 0 & 0 & 0 & 0 & -J & 0 \\ 0 & 0 & 0 & 0 & 0 & -J \\ J & 0 & 0 & 0 & 0 & 0 \\ 0 & J & 0 & 0 & 0 & 0 \\ 0 & 0 & J & 0 & 0 & 0 \end{bmatrix}$$

By subtracting these interference phenomena from the decoded signal x, we deduce $\bar{s}^{(p)}$.

3.3 Results

Figure 6:
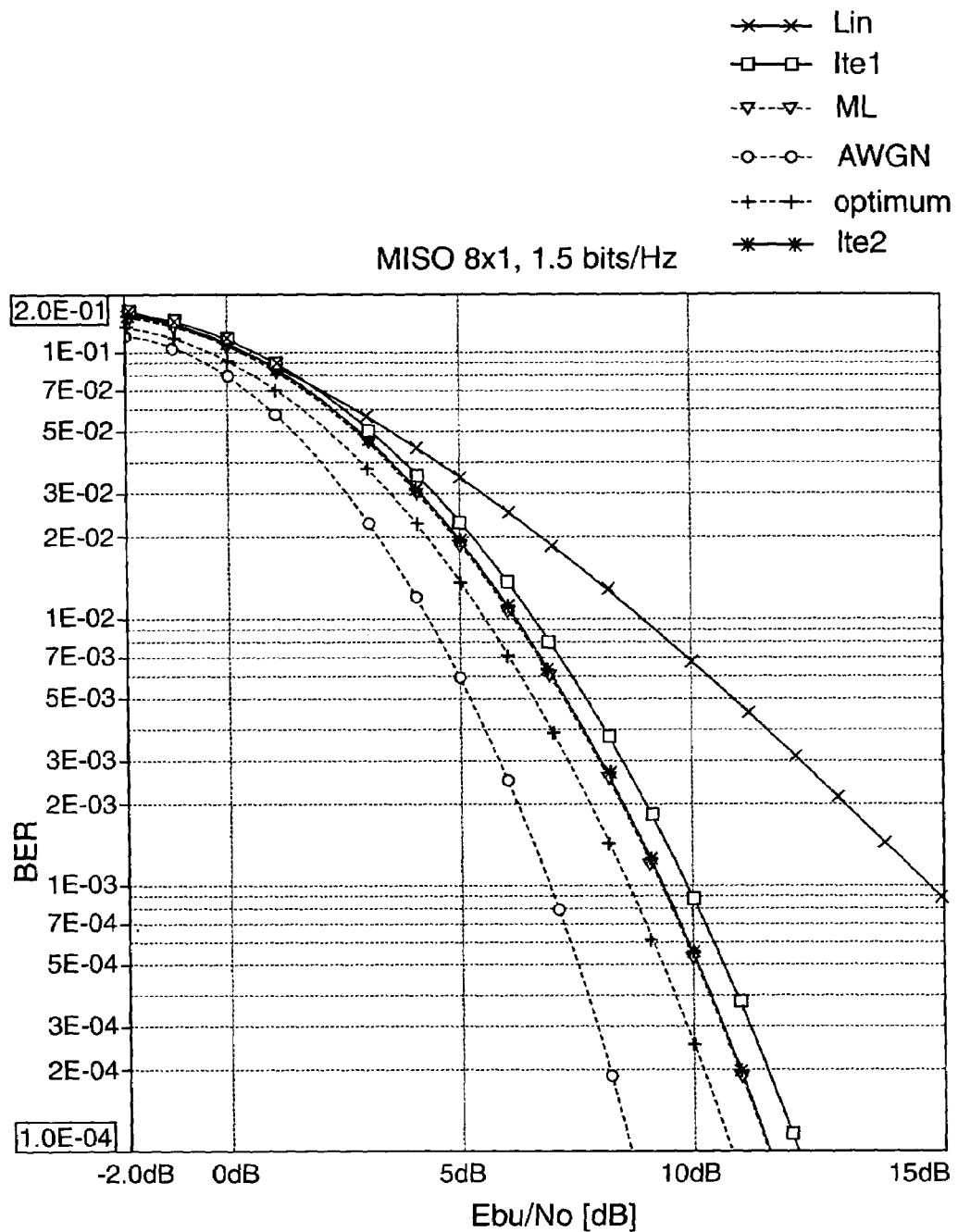
FIGS. 6 and 7 illustrate the performance of the iterative approach with two other codes and eight emitter antennas.

FIG. 6 presents the performance of the system proposed with the ¾ rate code for a four-state modulation (QPSK), without channel encoding (spectral efficiency=1.5 bits/Hz). The Rayleigh channels are considered to be white (not filtered) and constant on 16 symbol time intervals.

The curve Lin gives the performance of the linearly detected code (coarse decoding) while the curve ML represents the binary error rate of the same system detected by the ML algorithm. The curves named ite1 and ite2 represent the performance of the first two iterations of the proposed system while the optimum curve gives the optimal limit of the system consisting of a perfect cancellation of the interference (adapted filter).

4. Eight-Antenna ½ Rate Emission Scheme

The code presented here below does not exist in the literature. It was created from Tarokh's G4 code [8] following a Tirkkonen ABBA scheme [6]. Eight emitter antennas, E1, E2, E3, E4, E5, E6, E7, E8 and one reception antenna R1 are still considered, along with eight propagation channels: h1, h2, h3, h4, h5, h6, h7, h8.

The complex symbols to be emitted are called s1, s2, s3, s4, s5, s6, s7 and s8. There are 16 emission time intervals available, IT1 . . . IT16 during which the contributions hi are assumed to be constant.

4.1 Emission

The following is the emission scheme:

| | IT1 | IT2 | IT3 | IT4 | IT5 | IT6 | IT7 | IT8 | IT9 | IT10 | IT11 | IT12 | IT13 | IT14 | IT15 | IT16 |
|---|---|---|---|---|---|---|---|---|---|---|---|---|---|---|---|---|
| Antenna E1 | $s_1$ | $-s_2$ | $-s_3$ | $-s_4$ | $s_1^*$ | $-s_2^*$ | $-s_3^*$ | $-s_4^*$ | $s_5$ | $-s_6$ | $-s_7$ | $-s_8$ | $s_5^*$ | $-s_6^*$ | $-s_7^*$ | $-s_8^*$ |
| Antenna E2 | $s_2$ | $s_1$ | $s_4$ | $-s_3$ | $s_2^*$ | $s_1^*$ | $s_4^*$ | $-s_3^*$ | $s_6$ | $s_5$ | $s_8$ | $-s_7$ | $s_6^*$ | $s_5^*$ | $s_8^*$ | $-s_7^*$ |
| Antenna E3 | $s_3$ | $-s_4$ | $s_1$ | $s_2$ | $s_3^*$ | $-s_4^*$ | $s_1^*$ | $s_2^*$ | $s_7$ | $-s_8$ | $s_5$ | $s_6$ | $s_7^*$ | $-s_8^*$ | $s_5^*$ | $s_6^*$ |
| Antenna E4 | $s_4$ | $s_3$ | $-s_2$ | $s_1$ | $s_4^*$ | $s_3^*$ | $-s_2^*$ | $s_1^*$ | $s_8$ | $s_7$ | $-s_6$ | $s_5$ | $s_8^*$ | $s_7^*$ | $-s_6^*$ | $s_5^*$ |
| Antenna E5 | $s_5$ | $-s_6$ | $-s_7$ | $-s_8$ | $s_5^*$ | $-s_6^*$ | $-s_7^*$ | $-s_8^*$ | $s_1$ | $-s_2$ | $-s_3$ | $-s_4$ | $s_1^*$ | $-s_2^*$ | $-s_3^*$ | $-s_4^*$ |
| Antenna E6 | $s_6$ | $s_5$ | $s_8$ | $-s_7$ | $s_6^*$ | $s_5^*$ | $s_8^*$ | $-s_7^*$ | $s_2$ | $s_1$ | $s_4$ | $-s_3$ | $s_2^*$ | $s_1^*$ | $s_4^*$ | $-s_3^*$ |
| Antenna E7 | $s_7$ | $-s_8$ | $s_5$ | $s_6$ | $s_7^*$ | $-s_8^*$ | $s_5^*$ | $s_6^*$ | $s_3$ | $-s_4$ | $s_1$ | $s_2$ | $s_3^*$ | $-s_4^*$ | $s_1^*$ | $s_2^*$ |
| Antenna E8 | $s_8$ | $s_7$ | $-s_6$ | $s_5$ | $s_8^*$ | $s_7^*$ | $-s_6^*$ | $s_5^*$ | $s_4$ | $s_3$ | $-s_2$ | $s_1$ | $s_4^*$ | $s_3^*$ | $-s_2^*$ | $s_1^*$ |

(.)* represents the complex conjugation operator.

It is noted that the rate of this code is ½.

During the sixteen time intervals, the following samples are received:

$$r_n = \sum_{i=1}^{8} S_{i,n} \cdot h_i + n_n,$$

with $1 \leq i \leq 8$, $1 \leq n \leq 16$ and S the mapping matrix corresponding to the following scheme.

In overlooking the noise, an equivalent matrix representation is written as follows:

$$\bar{r} = Hs$$

with $$H = \begin{bmatrix} h_1 & h_2 & h_3 & h_4 & h_5 & h_6 & h_7 & h_8 \\ h_2 & -h_1 & h_4 & -h_3 & h_6 & -h_5 & h_8 & -h_7 \\ h_3 & -h_4 & -h_1 & h_2 & h_7 & -h_8 & -h_5 & h_6 \\ h_4 & h_3 & -h_2 & -h_1 & h_8 & h_7 & -h_6 & -h_5 \\ h_1^* & h_2^* & h_3^* & h_4^* & h_5^* & h_6^* & h_7^* & h_8^* \\ h_2^* & -h_1^* & h_4^* & -h_3^* & h_6^* & -h_5^* & h_8^* & -h_7^* \\ h_3^* & -h_4^* & -h_1^* & h_2^* & h_7^* & -h_8^* & -h_5^* & h_6^* \\ h_4^* & h_3^* & -h_2^* & -h_1^* & h_8^* & h_7^* & -h_6^* & -h_5^* \\ h_5 & h_6 & h_7 & h_8 & h_1 & h_2 & h_3 & h_4 \\ h_6 & -h_5 & h_8 & -h_7 & h_2 & -h_1 & h_4 & -h_3 \\ h_7 & -h_8 & -h_5 & h_6 & h_3 & -h_4 & -h_1 & h_2 \\ h_8 & h_7 & -h_6 & -h_5 & h_4 & h_3 & -h_2 & -h_1 \\ h_5^* & h_6^* & h_7^* & h_8^* & h_1^* & h_2^* & h_3^* & h_4^* \\ h_6^* & -h_5^* & h_8^* & -h_7^* & h_2^* & -h_1^* & h_4^* & -h_3^* \\ h_7^* & -h_8^* & -h_5^* & h_6^* & h_3^* & -h_4^* & -h_1^* & h_2^* \\ h_8^* & h_7^* & -h_6^* & -h_5^* & h_4^* & h_3^* & -h_2^* & -h_1^* \end{bmatrix},$$

$$s = \begin{bmatrix} s_1 \\ s_2 \\ s_3 \\ s_4 \\ s_5 \\ s_6 \\ s_7 \\ s_8 \end{bmatrix} \text{ and } \tilde{r} = \begin{bmatrix} r_1 \\ r_2 \\ r_3 \\ r_4 \\ r_1^* \\ r_2^* \\ r_3^* \\ r_4^* \\ r_5 \\ r_6 \\ r_7 \\ r_8 \\ r_5^* \\ r_6^* \\ r_7^* \\ r_8^* \end{bmatrix}$$

4.2 Reception

When decoding, the matrix $H^H$ is applied, followed by an MMSE equalization coefficient $\gamma$:

$x = \gamma \cdot H^H \cdot \tilde{r} = \gamma \cdot H^H H \cdot s$, the total matrix G is written as follows:

$$G = \gamma \cdot H^H \cdot H = \gamma \begin{bmatrix} A & 0 & 0 & 0 & J & 0 & 0 & 0 \\ 0 & A & 0 & 0 & 0 & J & 0 & 0 \\ 0 & 0 & A & 0 & 0 & 0 & J & 0 \\ 0 & 0 & 0 & A & 0 & 0 & 0 & J \\ J & 0 & 0 & 0 & A & 0 & 0 & 0 \\ 0 & J & 0 & 0 & 0 & A & 0 & 0 \\ 0 & 0 & J & 0 & 0 & 0 & A & 0 \\ 0 & 0 & 0 & J & 0 & 0 & 0 & A \end{bmatrix}$$

with $$A = 2 \cdot (|h_1|^2 + |h_2|^2 + |h_3|^2 + |h_4|^2 + |h_5|^2 + |h_6|^2 + |h_7|^2 + |h_8|^2)$$
$$J = 2\mathrm{Re}\{h_1 h_5^* + h_2 h_6^* + h_3 h_7^* + h_4 h_8^*\} et$$
$$\gamma = \frac{1}{2} \cdot \frac{1}{|h_1|^2 + |h_2|^2 + |h_3|^2 + |h_4|^2 + |h_5|^2 + |h_6|^2 + |h_7|^2 + |h_8|^2 + \frac{1}{SNR}}$$

It is noted that A follows a $\chi_2^8$ law ($8^{th}$ order diversity).

The two steps of an embodiment of the invention are performed as follows:

4.2.1 Diagonalization

The matrix used to diagonalize G is:

$$\Phi = \begin{bmatrix} A & 0 & 0 & 0 & -J & 0 & 0 & 0 \\ 0 & A & 0 & 0 & 0 & -J & 0 & 0 \\ 0 & 0 & A & 0 & 0 & 0 & -J & 0 \\ 0 & 0 & 0 & A & 0 & 0 & 0 & -J \\ -J & 0 & 0 & 0 & A & 0 & 0 & 0 \\ 0 & -J & 0 & 0 & 0 & A & 0 & 0 \\ 0 & 0 & -J & 0 & 0 & 0 & A & 0 \\ 0 & 0 & 0 & -J & 0 & 0 & 0 & A \end{bmatrix}$$

We obtain:

$$G_{diag} = \Phi \cdot G$$

$$= \gamma \begin{bmatrix} A^2 - J^2 & 0 & 0 & 0 & 0 & 0 & 0 & 0 \\ 0 & A^2 - J^2 & 0 & 0 & 0 & 0 & 0 & 0 \\ 0 & 0 & A^2 - J^2 & 0 & 0 & 0 & 0 & 0 \\ 0 & 0 & 0 & A^2 - J^2 & 0 & 0 & 0 & 0 \\ 0 & 0 & 0 & 0 & A^2 - J^2 & 0 & 0 & 0 \\ 0 & 0 & 0 & 0 & 0 & A^2 - J^2 & 0 & 0 \\ 0 & 0 & 0 & 0 & 0 & 0 & A^2 - J^2 & 0 \\ 0 & 0 & 0 & 0 & 0 & 0 & 0 & A^2 - J^2 \end{bmatrix}$$

A linear detection is therefore possible. We obtain $\hat{s}^{(0)}$ and then, after decision $\bar{s}^{(0)}$.

4.2.2 Cancellation of Interference

The interferences are reconstructed by multiplying the vector $\bar{s}^{(p-1)}$ of the data estimated at the preceding step by the matrix $J_8$:

$$J_8 = \gamma \begin{bmatrix} 0 & 0 & 0 & 0 & J & 0 & 0 & 0 \\ 0 & 0 & 0 & 0 & 0 & J & 0 & 0 \\ 0 & 0 & 0 & 0 & 0 & 0 & J & 0 \\ 0 & 0 & 0 & 0 & 0 & 0 & 0 & J \\ J & 0 & 0 & 0 & 0 & 0 & 0 & 0 \\ 0 & J & 0 & 0 & 0 & 0 & 0 & 0 \\ 0 & 0 & J & 0 & 0 & 0 & 0 & 0 \\ 0 & 0 & 0 & J & 0 & 0 & 0 & 0 \end{bmatrix}$$

By subtracting this interference from the decoded signal x, we deduce $\bar{s}^{(p)}$.

4.3 Results

Figure 7:
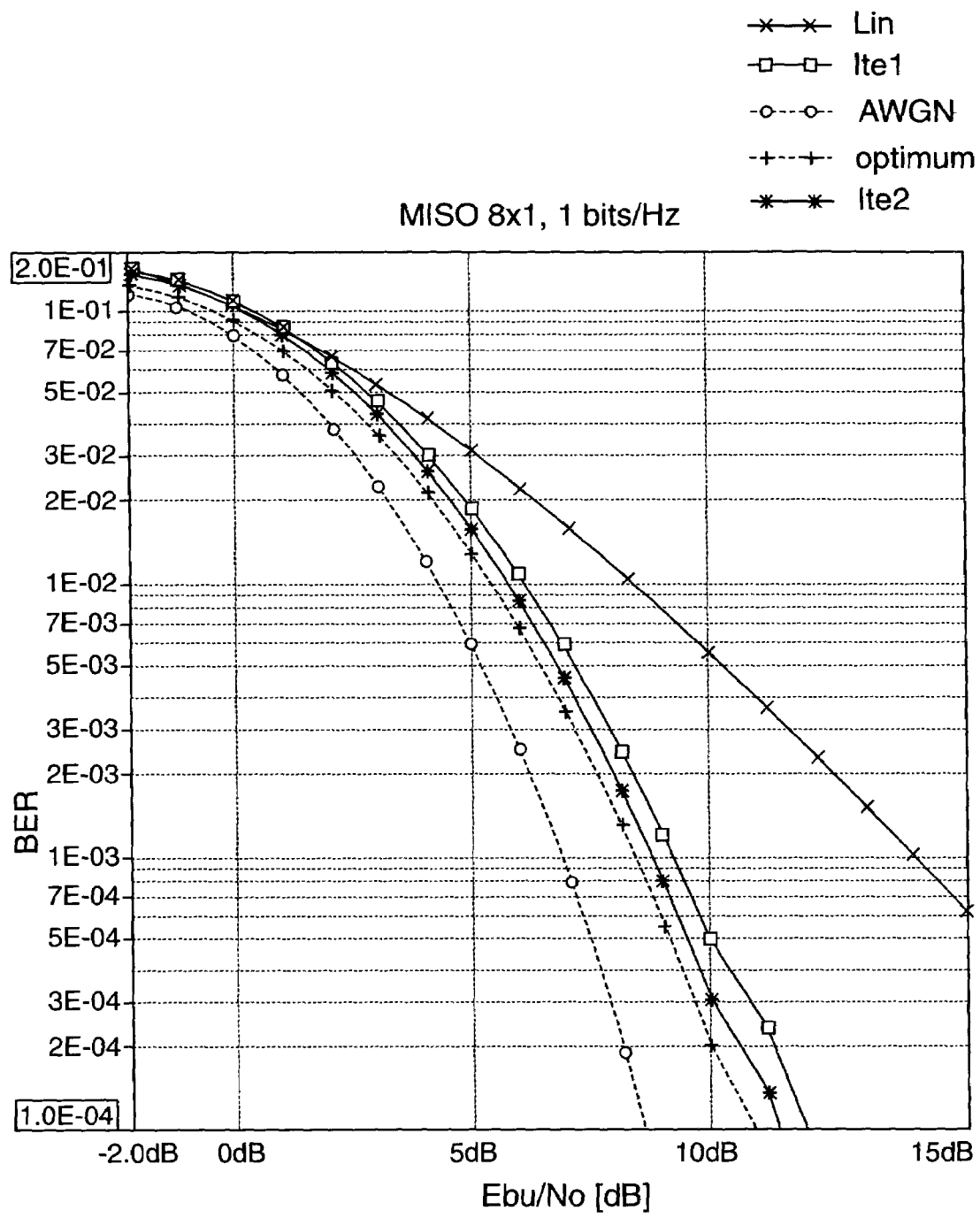

FIG. 7 presents the performance of the proposed system with the ½ rate code for a four-state modulation (QPSK), without channel encoding (spectral efficiency=1 bit/Hz). The Rayleigh channels are considered to be white (not filtered) and constant on 16 symbol time intervals.

The curve Lin gives the performance of the linearly detected code (coarse decoding). The curves named Ite1 and Ite2 represent the performance of the first two iterations of the proposed system while the optimum curve gives the optimal limit of the system consisting of a perfect cancellation of the interference (adapted filter).

The curve ML, which is too long to simulate, is not presented in the results (it would quite obviously be indistinguishable from the curve ite2). It can be seen that, as compared with the rate ¾ code, the performance of ite2 gets yet a little closer to the optimal value.

5. Association with the Linear Pre-Encoding Technique

The pre-encoding introduced by V. Le Nir in [10] provides for a gain in diversity while remaining at the same spectral efficiency, and does so for orthogonal space-time codes.

5.1 Original Scheme

This document proposes an approach designed for orthogonal space-time codes, according to which the symbols to be emitted are pre-encoded with a particular linear pre-encoding matrix before being encoded by a block space-time encoding operation. This approach simplifies processing at reception.

5.2 Approach of the Invention

For non-orthogonal space-time codes, the pre-encoding scheme presented in this document no longer works owing to interference created by the non-orthogonality of the codes.

Figure 8:
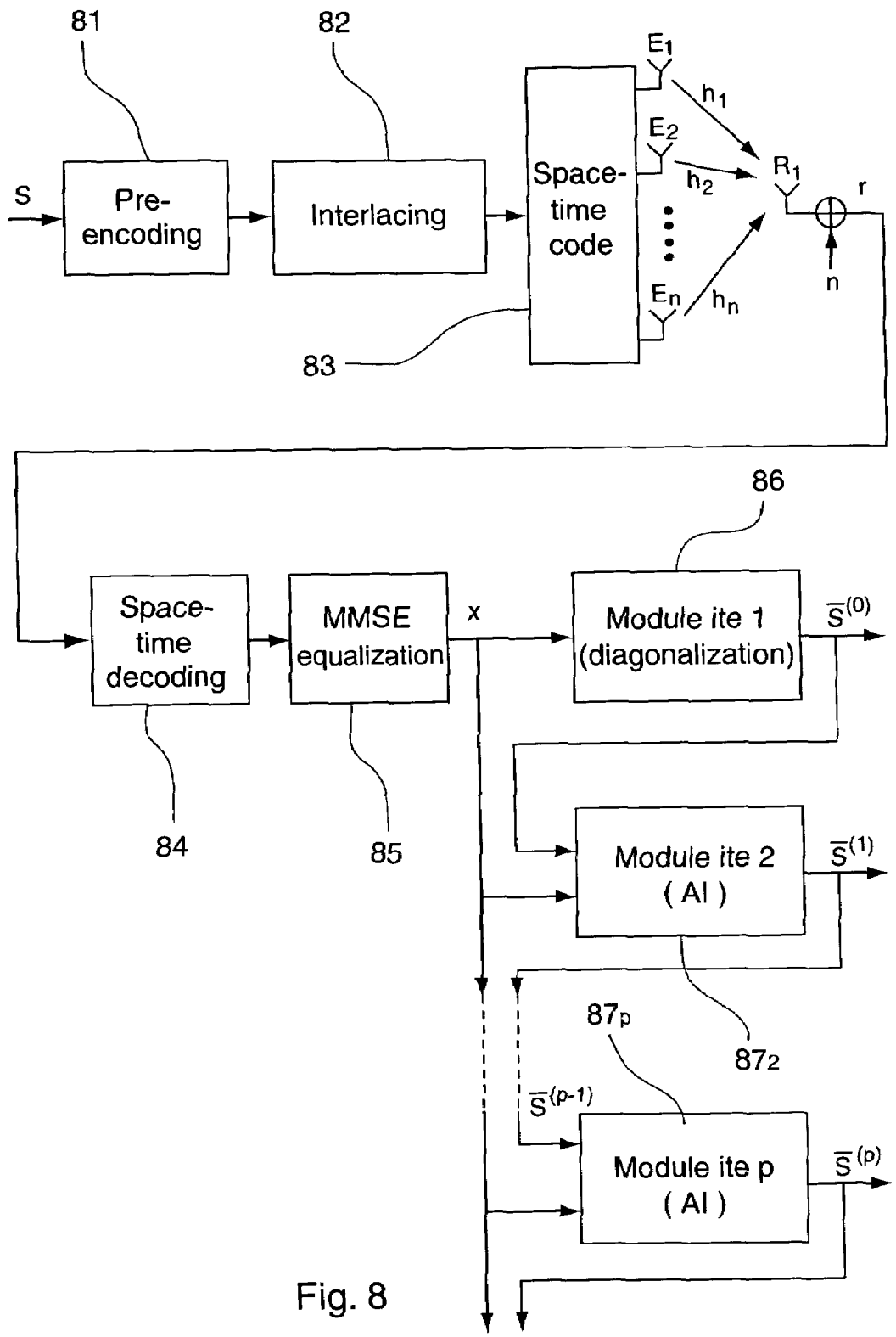
FIG. 8 is a general drawing of the approach of an embodiment of the invention, implementing a linear diversity pre-encoding.

For such codes, an embodiment of the invention provides for simple decoding through the most efficient use of the diversity provided by the space-time code and also by the pre-encoding scheme. FIG. 8 presents a (non-orthogonal) space-time encoding system associated with pre-encoding, as well as the corresponding receiver.

Provision is therefore made, at emission, for a pre-encoding 81, of the type proposed in [10], and then for an interlacing 82 and a space-time encoding 83. The signals are emitted by means of n emitter antennas $E_i$, via n transmission channels $h_p$, to a reception antenna $R_1$ (naturally, several reception antennas can be planned).

At reception, first of all a space-time decoding 84 is performed, symmetrical with the encoding performed at emission, followed by an equalization 85, for example of the MMSE type.

Figure 9:
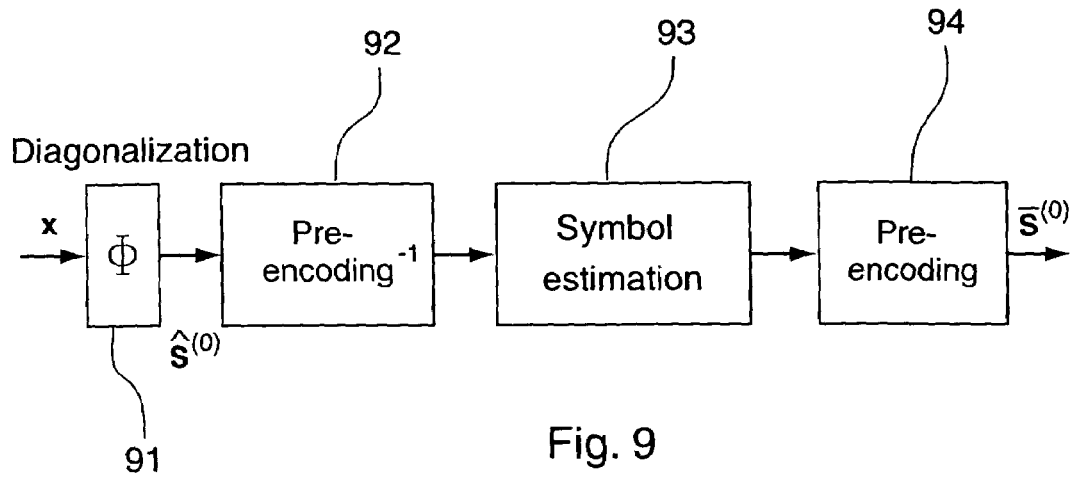
FIG. 9 illustrates the first iteration of FIG. 8.
Figure 10:
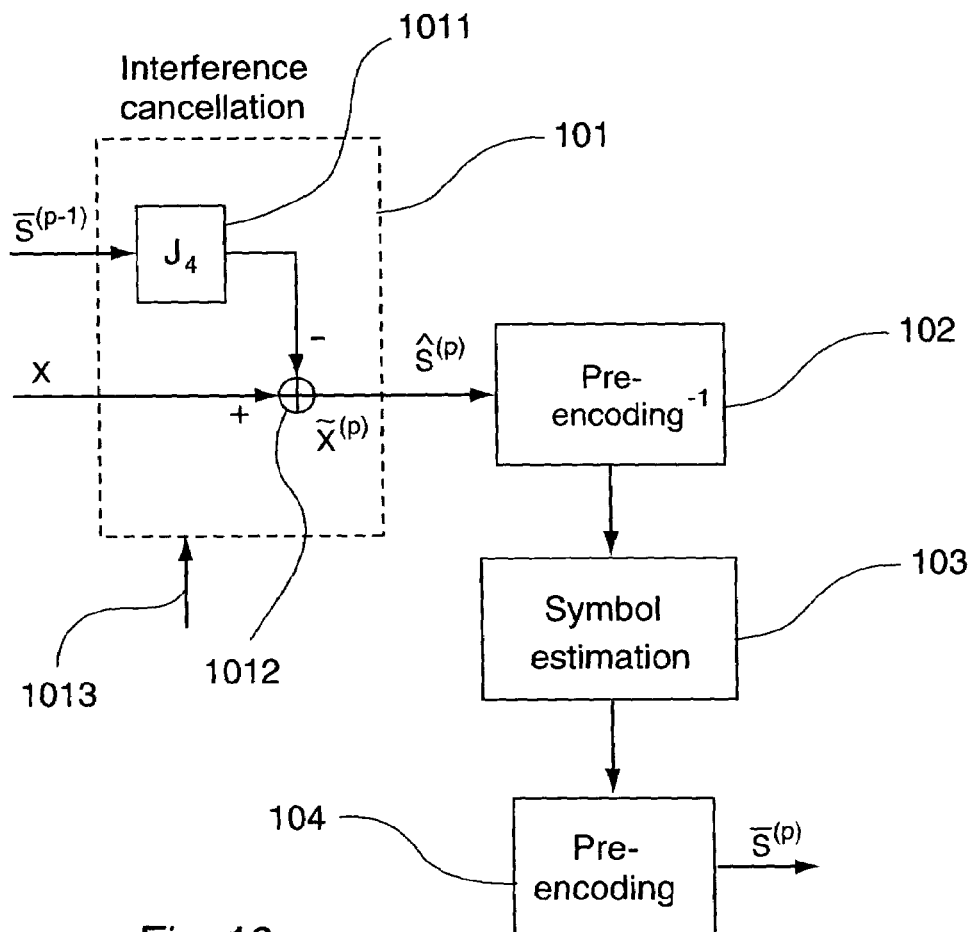
FIG. 10 illustrates the following iterations of FIG. 8.

The different iterations, according to the approach described here above, are again performed:
 iteration 1: diagonalization 86, described in detail in FIG. 9;
 following iterations: the cancellation of interference $87_2$ to $87_p$, described in detail in FIG. 10.

As illustrated in FIG. 9, the diagonalization step comprises first of all a diagonalization 91 proper, as described here above. It is followed by a de-interlacing operation, symmetrical with the interlacing operation performed at emission, and then by an inverse pre-decoding operation 92 symmetrical with the pre-encoding operation performed at emission, and then by a symbol estimation 93. Then, a new pre-encoding operation 94, identical with the one made at emission, is performed on the estimated symbols and finally an interlacing operation is performed, identical with the one performed at emission.

The corresponding signal feeds the first interference cancellation iteration, as illustrated in FIG. 10. It is multiplied by an interference matrix 1011, whose result is subtracted (1012) from the equalized signal, for the performing of the cancellation of interference 101. In the event of the implementation of soft decisions, a piece of information on reliability 1013 may be taken into account.

Then, in each iteration, the operations also performed during the diagonalization step are repeated: de-interlacing symmetrical with the interlacing performed at emission, inverse pre-decoding 102, symmetrical with the pre-encoding performed at emission, then estimation of the symbols 103. Then a new pre-encoding 104, identical to the one performed at emission, is carried out on the estimated signals and finally an interlacing is carried out, identical with the one performed at emission. The result $\bar{s}^{(p-1)}$ is reintroduced into the next iteration or, for the last iteration, taken into account for the remainder of the processing operation.

5.3 Results

The simulation conditions of the four-antenna emission system are taken up (Jafarkhani space-time code, Rayleigh channel non-filtered, white and constant on four symbol time periods, QPSK modulation without channel encoding, spectral efficiency of 2 bits/Hz). The pre-encoding is chosen with a length 64, the interlacing is of an IQ type, uniform and with a length of 10000 symbol time intervals.

Figure 11:
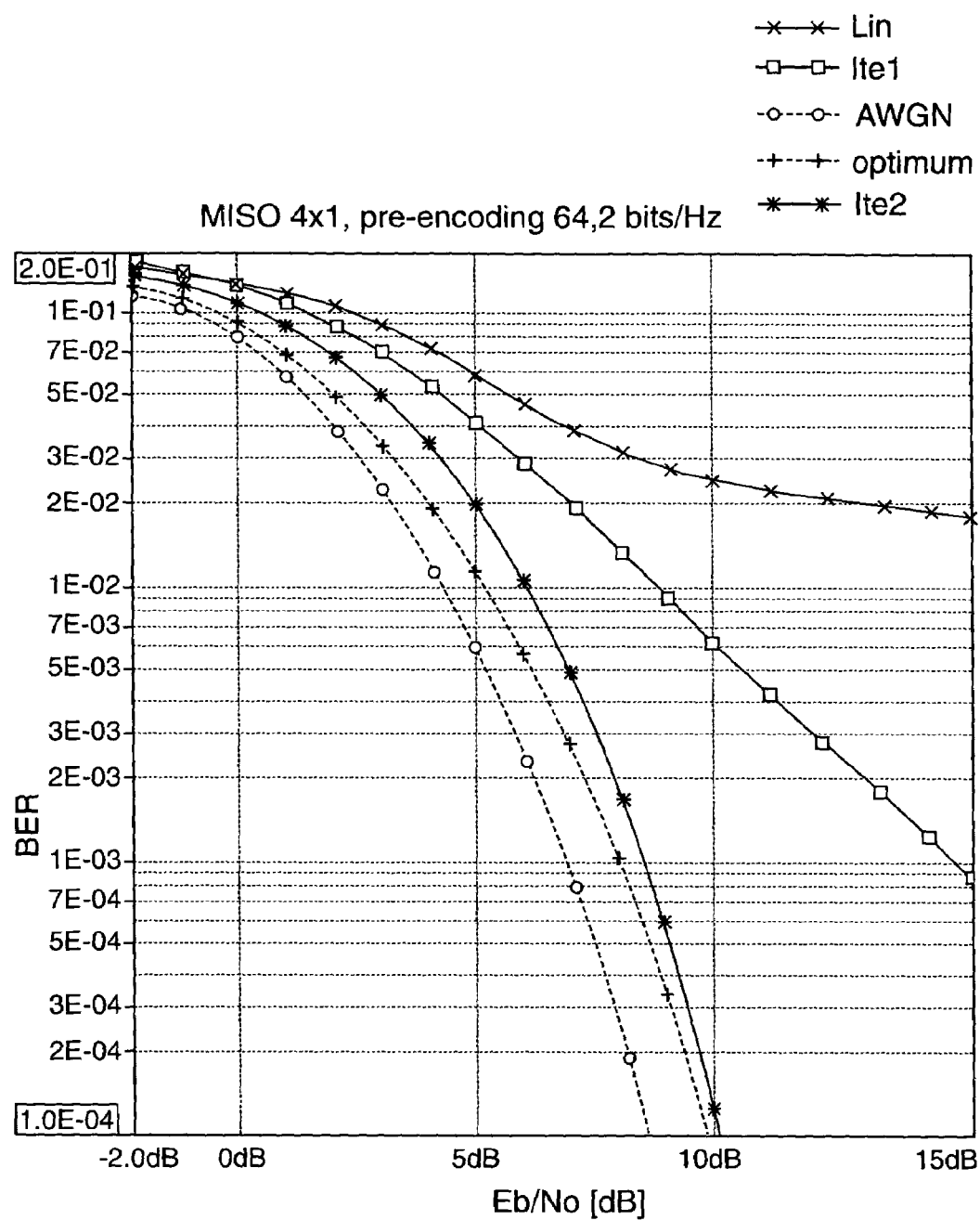
FIG. 11 presents the performance values of the method of FIG. 8, as compared with known decoding methods.

The results are illustrated in FIG. 11.

Lin represents the performance of the linearly decoded system (coarse decoding) with pre-encoding 64. Ite1 and Ite2 represent the performance of the first two iterations of the proposed system. Finally Optimum is the optimum limit of the system with pre-encoding: optimal cancellation of interferences and pre-encoding.

The curve Ite2 shows that the approach of an embodiment of the invention takes advantage of both types of diversity: pre-encoding and space-time codes. The resulting diversity is equal to 64*4=256. This is quasi-Gaussian diversity for a spectral efficiency of 2 bits/Hz. For further gain in diversity, it is possible to use one of the two eight-antenna codes presented here above.

6. Use of Spread-Spectrum Pre-Encoding

A similar approach may be used with spread-spectrum pre-encoding through the use, for example, of the CDMA, MC-CDMA, WCDMA, DS-CDMA, and other techniques.

Figure 12:
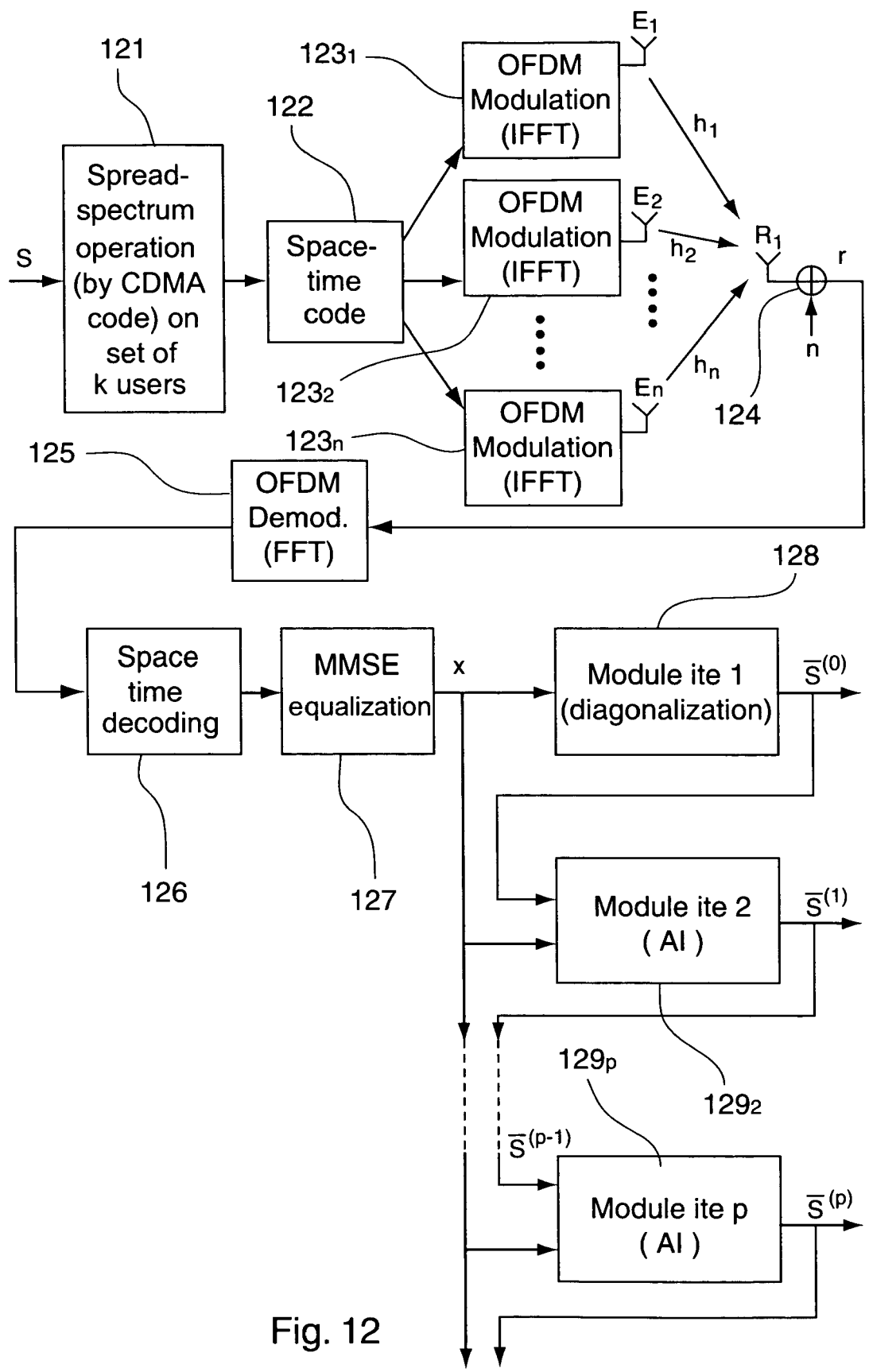
FIG. 12 illustrates another embodiment of the invention implementing a spread spectrum pre-encoding.

FIG. 12 illustrates the general principle of this approach. A spread-spectrum operation 121 is performed at emission on a set of k users, for example by means of a CDMA code. A space-time code 122 is then applied.

By means of n inverse FFT operations $123_1$ to $123_n$, n OFDM modulations are performed, emitted on n antennas $E_1$ to $E_n$. The reception antenna $R_1$ receives the signal corresponding to transmission via the n channels $h_1$ to $h_n$, to which the additive noise n gets added (124).

First of all, at reception, an OFDM demodulation is performed by means of a FFT 125. Then, in the same way as already described, a space-time decoding 126, and an equalization 127 are performed. The diagonalization steps 128 and the p iterations of interference cancellation $129_2$ to $129_p$ are then repeated.

Figure 13:
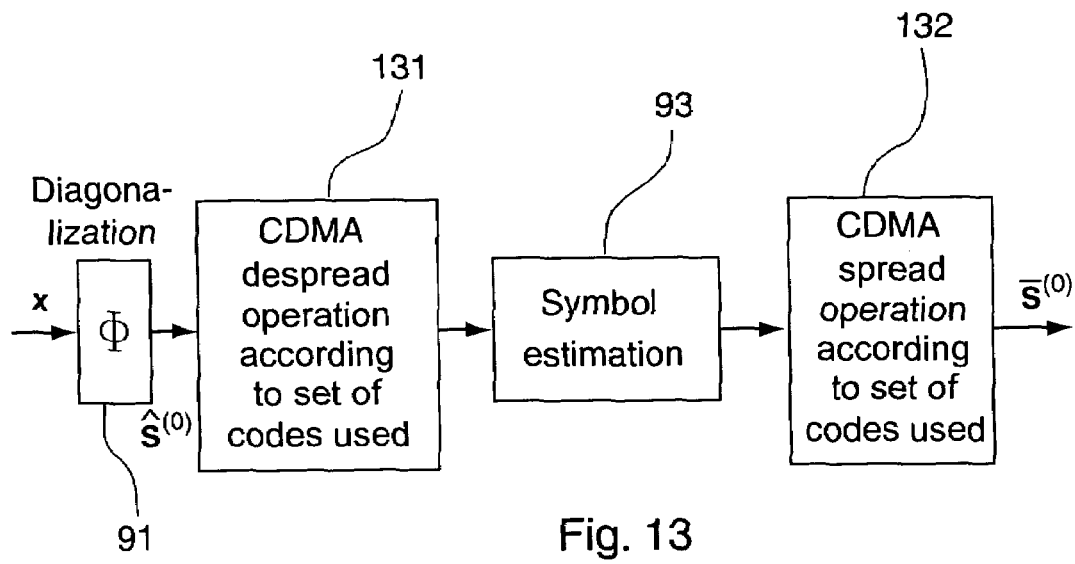
FIGS. 13 and 14 respectively present the first iteration and the following iterations of the drawing of FIG. 12.

The diagonalization, illustrated in FIG. 13, is similar to the one described here above, with the pre-decoding operation consisting of a CDMA despread operation 131 according to the user codes and the pre-encoding operation consisting of a CDMA spread operation 132 according to the user codes.

Figure 14:
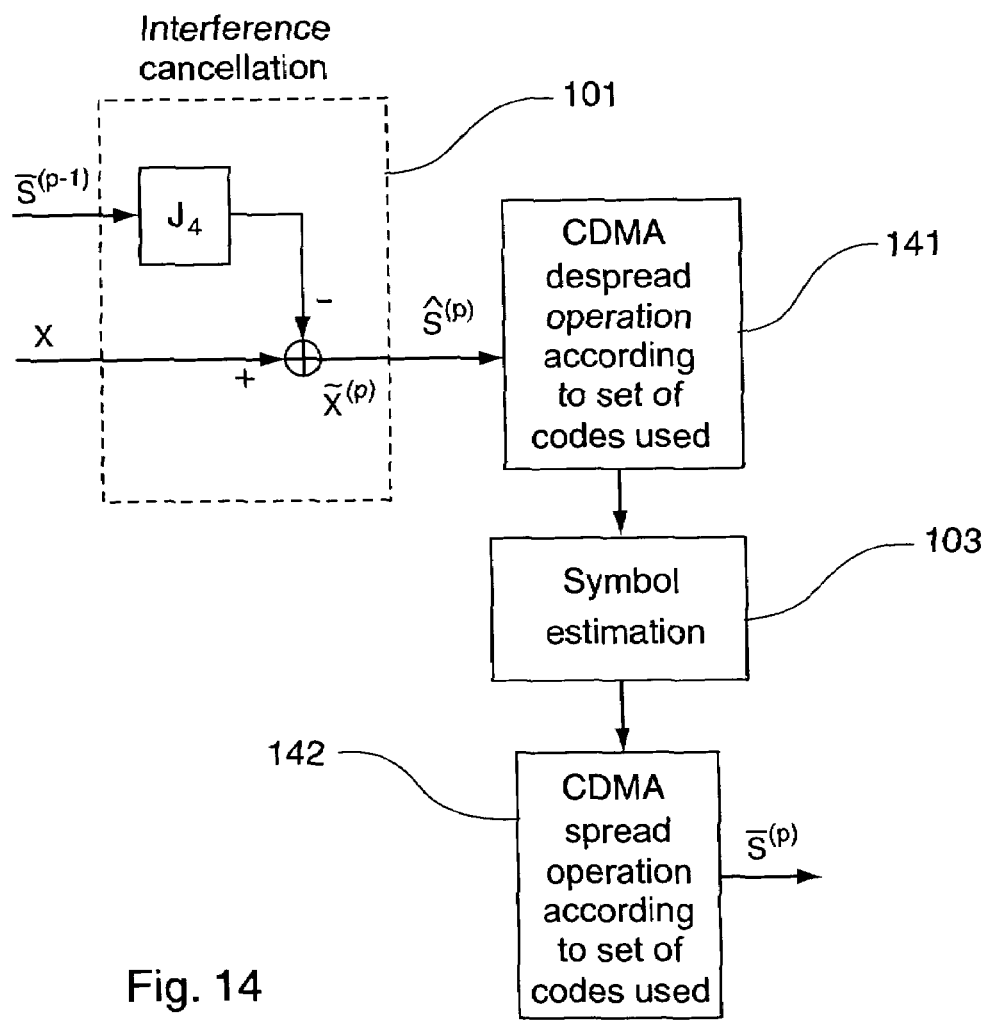

This despread operation 141 and spread operation 142 are also found in each interference cancellation iteration as illustrated in FIG. 14.

The other operations illustrated in these FIGS. 13 and 14 are not discussed again: they are identical to those described here above, with reference to FIGS. 9 and 10.

It will also be noted that, in the case of spread-spectrum pre-decoding of this kind, it is possible to carry out the same processing differently, by integrating not only the encoding, the channel and decoding, but also the spreading and despreading operations, into the total matrix.

In this case, the size of the matrix G used for the diagonalization and interference cancellation is greater than that of the space-time code, but the total processing is simplified. Generally, it must be noted that, in all cases, the size of this matrix may be greater than that of the space-time code, unlike in the approach proposed by Boariu.

Figure 15:
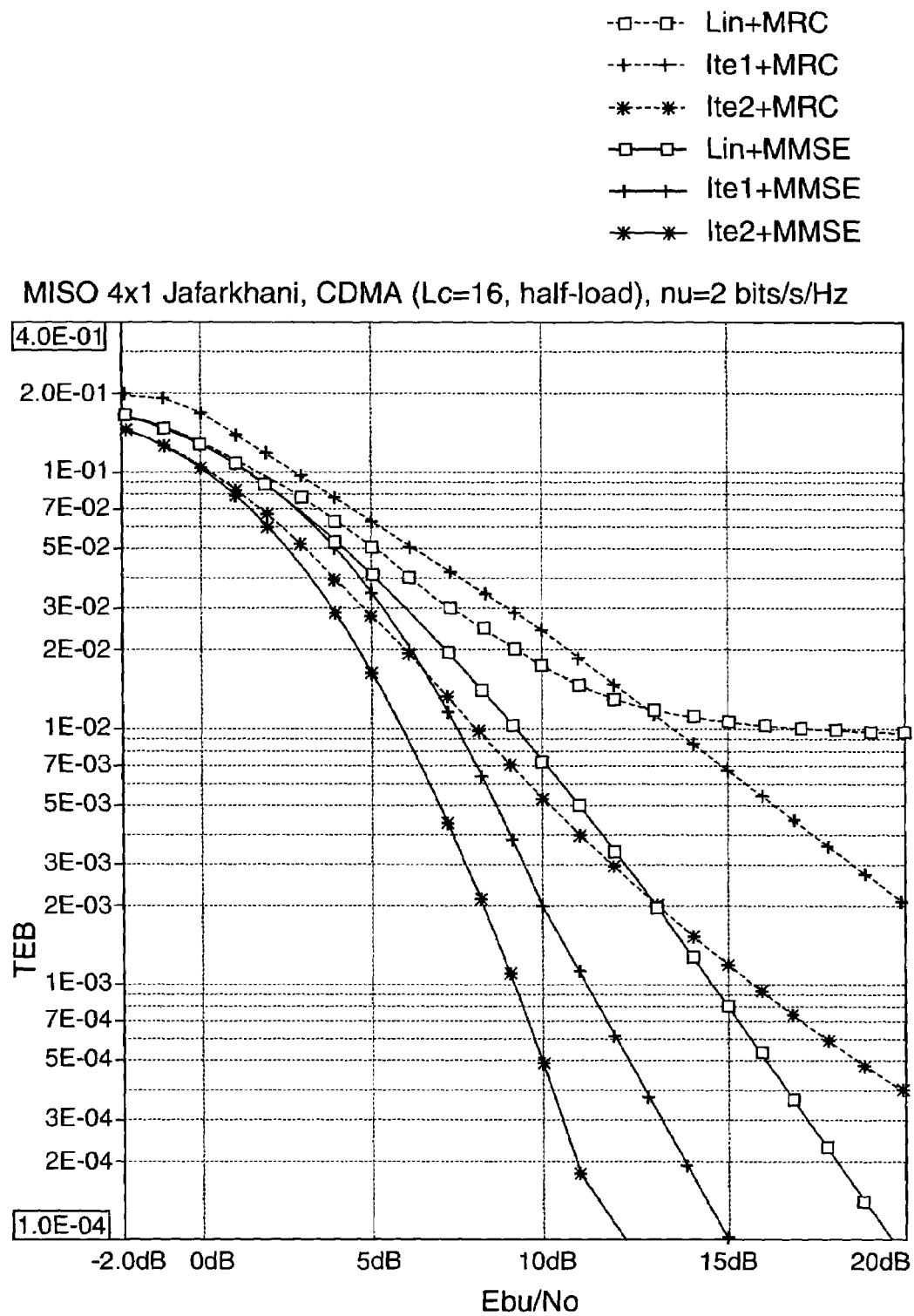
FIG. 15 presents the performance of the method of FIG. 12, as compared with known decoding methods.

FIG. 15 presents the results of this approach for a code with a length 16, eight users and a number of carriers equal to 1.

The MRC (Maximum Ratio Combining) filtering technique is combined with the approach of an embodiment of the invention implementing an equalization (in this case of the MMSE or Minimum Mean Square Error type). This latter approach gives far better results.

7. Association with Channel Encoding

Figure 16:
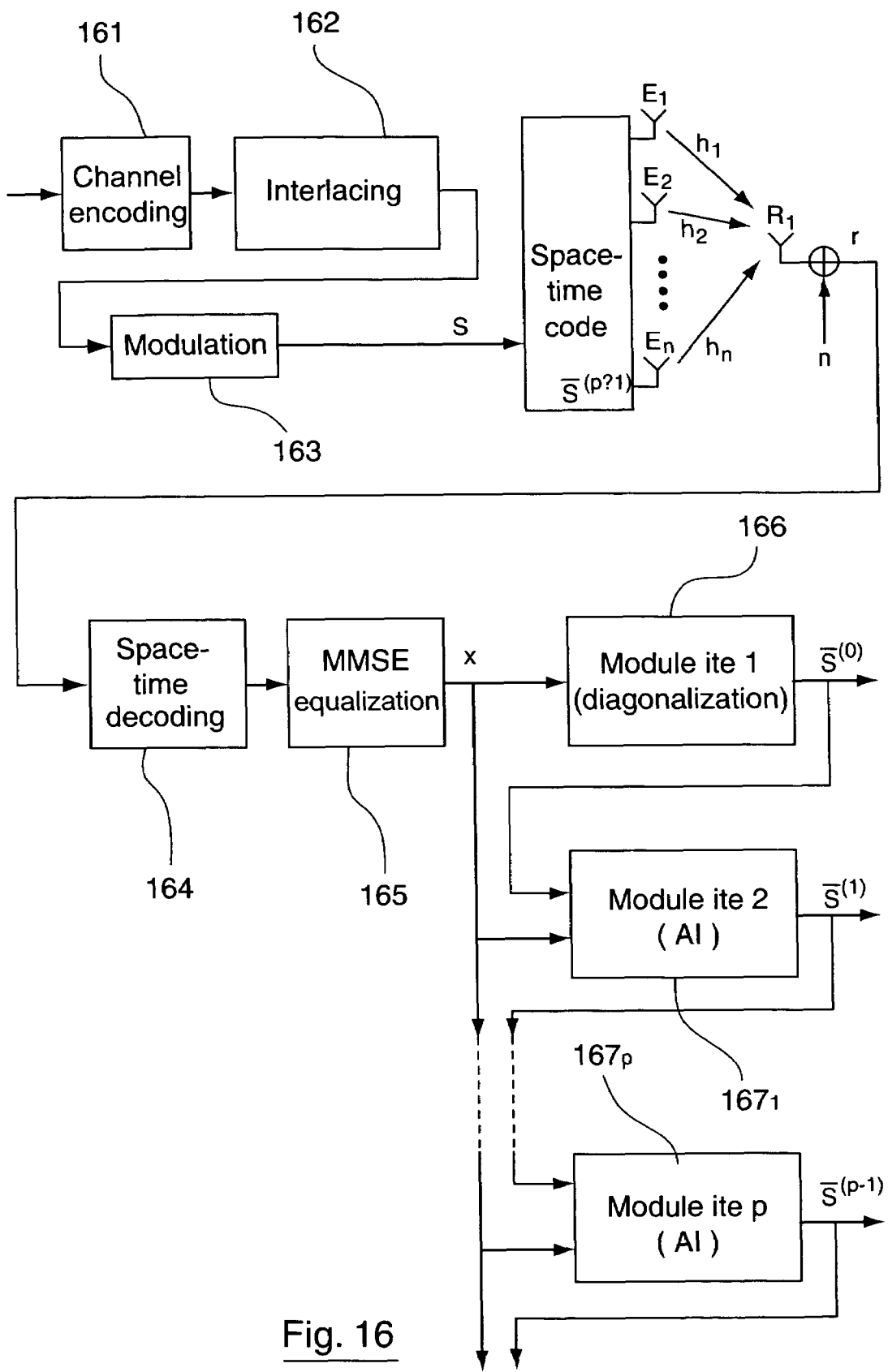
FIGS. 16 to 18 illustrate another embodiment of the invention in which a channel encoding and a pre-encoding are also implemented.

According to one embodiment of the invention, illustrated by FIG. 16, it is proposed to encode the symbols by means of a channel encoding. These symbols are then encoded by a space-time code. Channel encoding improves the performance of the overall system by adding redundant information.

At emission, it is therefore provided that there will be a channel encoding operation 161 (known per se in the literature) on the bits to be transmitted, followed by an interlacing 162 and a modulation operation 163. The symbols obtained are then encoded by means of a block space-time code 168. The signals are emitted by means of n emitter antennas $E_i$, via n transmission channels $h_p$, to a reception antenna $R_1$ (naturally, several reception antennas can be planned).

At reception, first of all a space-time decoding 164 is performed, symmetrical with the encoding performed at emission, followed by an equalization 165, for example of the MMSE type.

Figure 17:
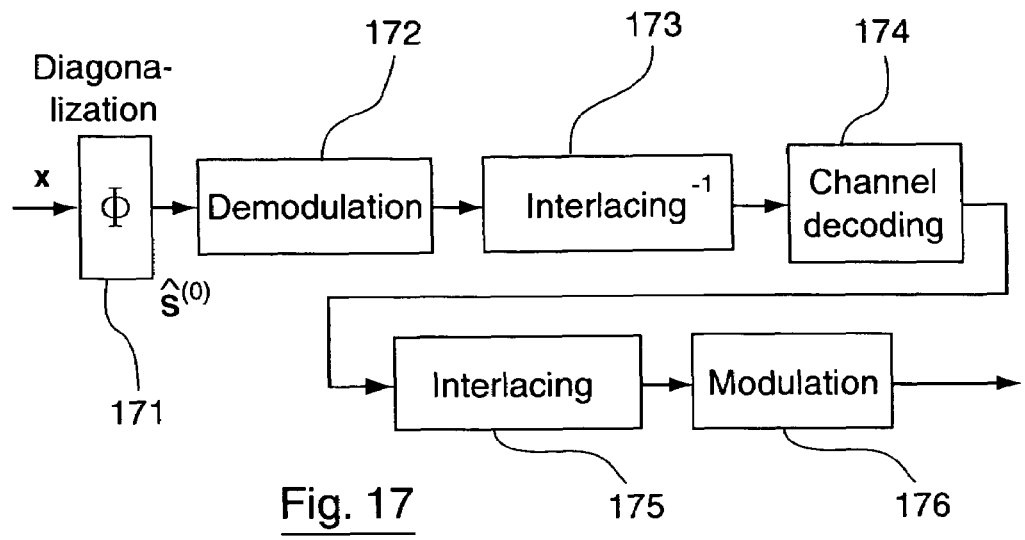
Figure 18:
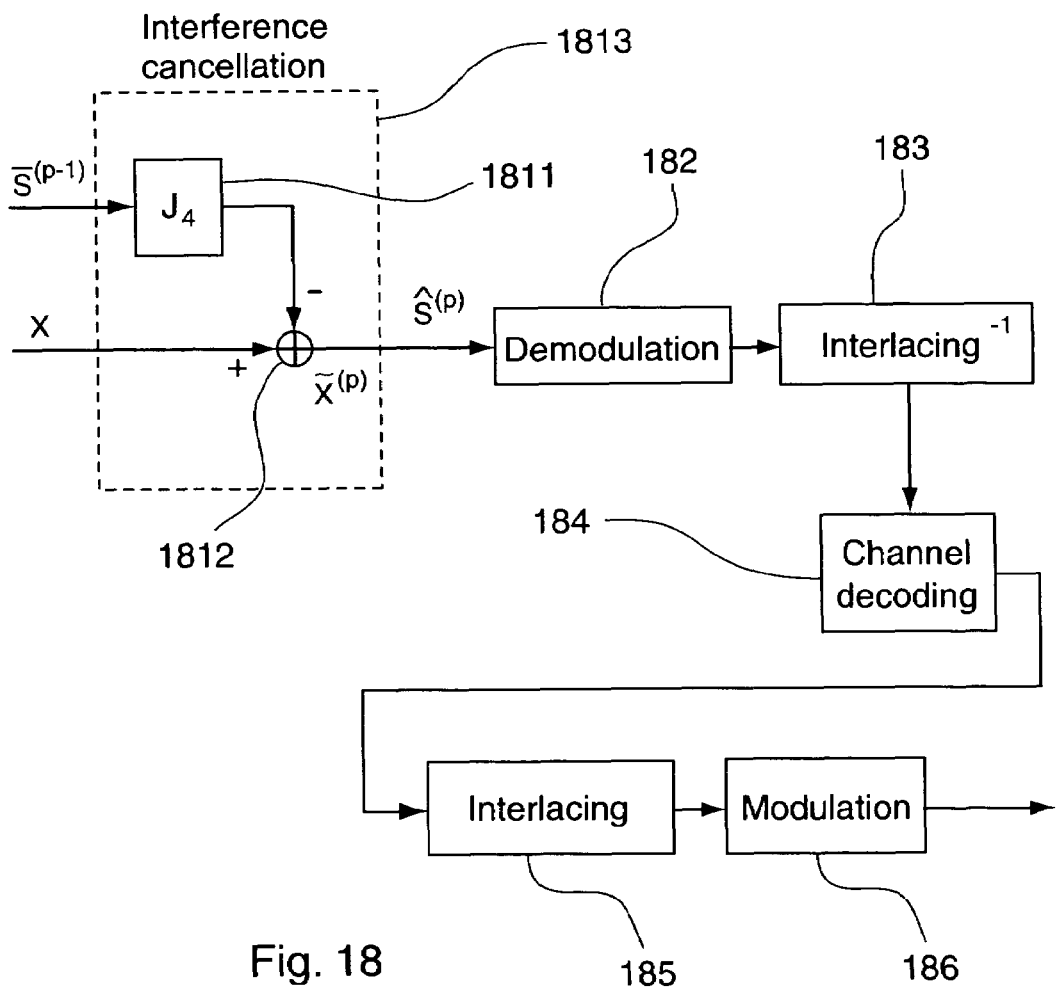

The iterations according to the approach described here above are then carried out:
  iteration 1: diagonalization 166, described in detail in FIG. 17;
  following iterations: cancellation of interference $167_2$ to $167_p$, described in detail in FIG. 18.

As illustrated in FIG. 17, the diagonalization step comprises first of all a diagonalization 171 proper, as described here above. It is followed by a demodulation operation 172, which is symmetrical to the modulation performed at emission. This demodulation may be soft in the sense that it delivers a piece of confidence information on the demodulated bits.

The term "modulation" is understood here as a conversion between one or more binary elements and a complex symbols. Demodulation is the inverse operation. When a lattice-encoded modulation is implemented, this phase of modulation or demodulation is equal to identity.

Then, a de-interlacing operation 173 is performed, symmetrical to the one made at emission, followed by a channel decoding operation 174 symmetrical to the channel-encoding operation performed at emission. This decoding produces a probability on the encoded bits, at output. The decoder can process soft information at input as well as at output.

Then, an interlacing 175 identical to the one performed at emission is carried out. Then, a modulation 176, again identical to the one performed at emission, is carried out. This modulation can accept soft data at input and can produce symbols at output that take account of the confidence level of the input bits, namely of the weighted symbols.

According to a particular embodiment, the demodulation and the channel decoding can be done in conjunction.

The corresponding signal feeds the first interference cancellation iteration, as illustrated in FIG. 16. It is multiplied by an interference matrix 1811, whose result is subtracted (1812) from the equalized signal, for the performing of the cancellation of interference 181. Should soft decisions be implemented, a piece of information on reliability 1813 may be taken into account.

Then, in each iteration, the operations also performed during the diagonalization step are repeated: demodulation 182, symmetrical with the modulation performed at emission. This demodulation may be soft in the sense that it can deliver a piece of confidence information on the demodulated bits.

Then, a de-interlacing 183 is performed, symmetrical with the one made at emission. Then a channel decoding operation 184 symmetrical with the channel encoding made at emission, is performed. This decoding produces a probability on the encoded bits at output. The decoder may process soft information both at input and at output.

Then an interlacing 185 is carried out, identical with the one performed at emission. Then a modulation 186, again identical with the one done at emission, is performed. This modulation may accept soft data at input and may produce the symbols at output taking account of the confidence level of the input bits, i.e. weighted symbols. The result $\tilde{s}^{(p-1)}$ is re-introduced into the next iteration or, for the last iteration, taken into account for the remainder of the processing operation.

The channel encoding 161 of FIG. 16 may be a turbo-code. In this case, the function 174 of FIG. 17 is a turbo-decoding operation with a number of turbo-decoding iterations that may be different, depending on each iteration of the total scheme.

8. Association with Channel Encoding and Pre-Encoding

According to another aspect of an embodiment of the invention, the symbols can be encoded by means of a channel-encoding operation and then pre-encoded. A space-time encoding is then performed.

Provision is therefore made, at emission, for a channel-encoding operation 191 (an operation very well known in the literature) on the bits to be transmitted, followed by an interlacing 192 and a modulation operation 193. The symbols obtained are then pre-encoded 194 and finally interlaced 195. The resulting symbols are finally encoded by means of a block space-time code 1910. The signals are emitted by means of n emitter antennas $E_i$, via n transmission channels $h_p$, to a reception antenna $R_1$ (naturally, several reception antennas can be planned).

At reception, first of all a space-time decoding 195 is performed, symmetrical with the encoding performed at emission, followed by an equalization 196, for example of the MMSE type.

Figure 20:
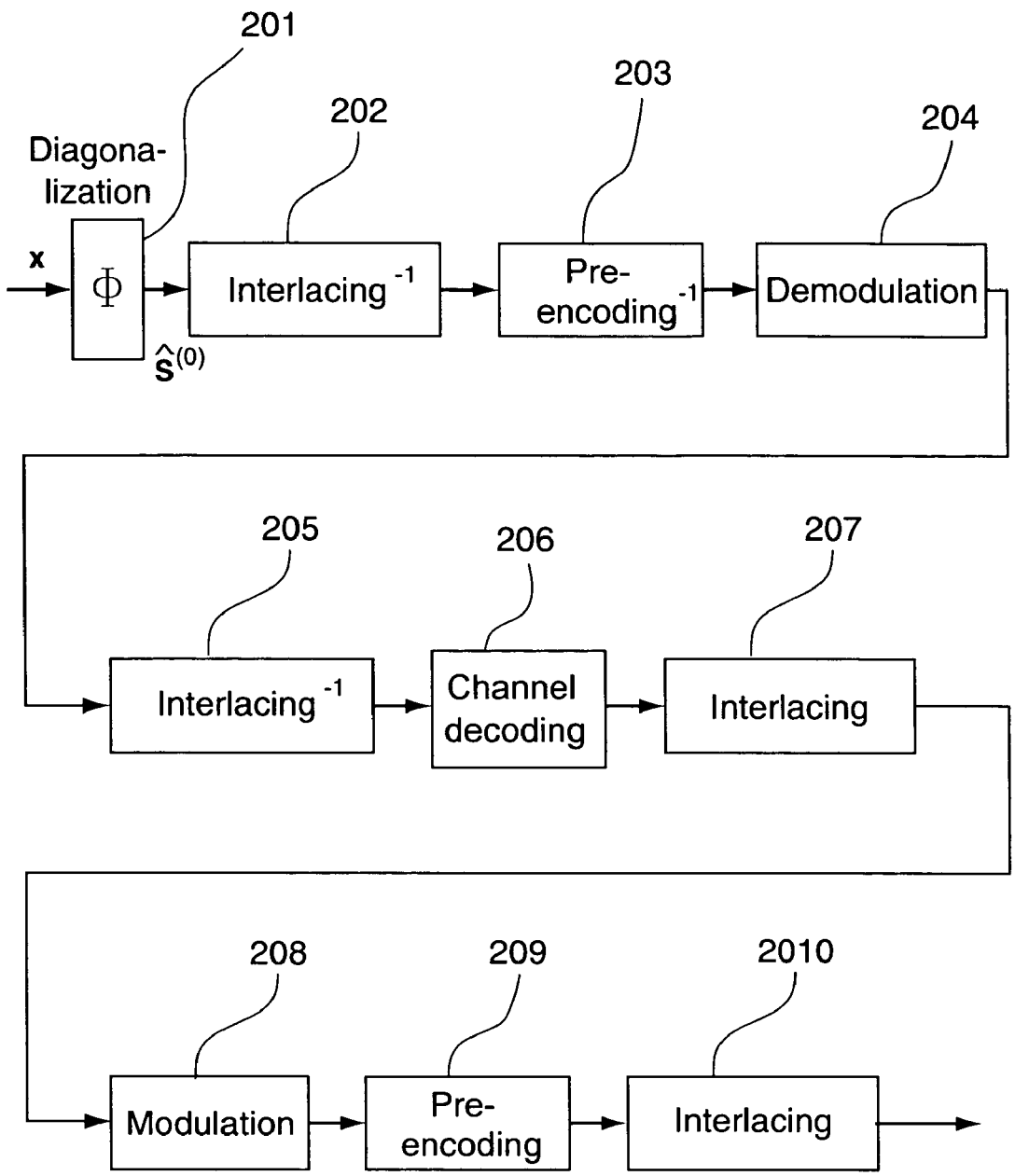
Figure 21:
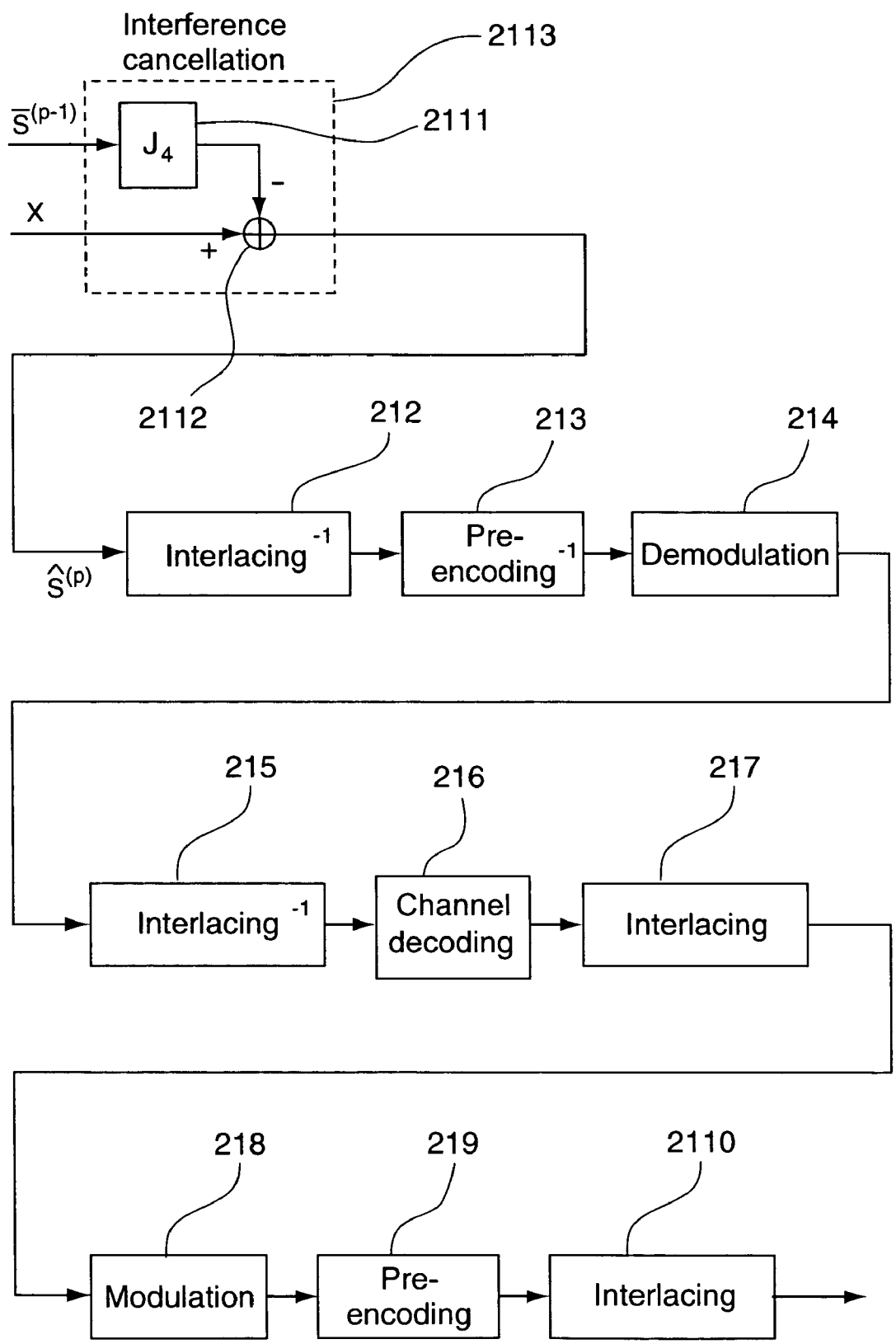

The different iterations according to the approach described here above are then carried out:
  iteration 1: diagonalization 197, described in detail in FIG. 20;
  following iterations: cancellation of interference $198_2$ to $198_p$, described in detail in FIG. 21.

As illustrated in FIG. 20, the diagonalization step comprises first of all a diagonalization 201 proper, as described here above. It is followed by a de-interlacing operation 202, symmetrical with the interlacing operation 195 performed at emission, and then by an inverse pre-decoding operation 203 symmetrical with the pre-encoding operation performed at emission.

Then a demodulation operation 204 is performed, symmetrical to the one performed at emission. This demodulation may be soft in the sense that it delivers a piece of confidence information on the demodulated bits.

Then, a de-interlacing operation 205 is performed, symmetrical to the one made at emission (192), followed by a channel-decoding operation 206 symmetrical to the channel-encoding operation performed at emission. This decoding produces a probability on the encoded bits at output. The decoder can process soft information at input as well as at output. Then, an interlacing 207 identical to the one performed at emission (192) is carried out. Then, a modulation 208, again identical to the one performed at emission, is carried out. This modulation can accept soft data at input and can produce symbols at output that take account of the confidence level of the input bits, i.e. of the weighted symbols. These symbols are then pre-encoded 209 as at emission and interlaced 2010 just as at emission.

The corresponding signal feeds the first interference cancellation iteration, as illustrated in FIG. 21. It is multiplied by an interference matrix 2111, whose result is subtracted (2112) from the equalized signal, for the performing of the cancellation of interference 211. Should soft decisions be implemented, a piece of information on reliability 2113 may be taken into account.

Then, in each iteration, the operations also performed during the diagonalization step are repeated: de-interlacing 212 symmetrical with the interlacing performed at emission (195), then an inverse pre-encoding 213, symmetrical with the pre-encoding performed at emission.

Then a demodulation operation 214 is performed, symmetrical to the operation performed at emission. This demodulation may be soft in the sense that it delivers a piece of confidence information on the demodulated bits. Then, a de-interlacing operation 215 is performed, symmetrical to the one made at emission (192), followed by a channel-decoding operation 216 symmetrical to the channel-encoding operation performed at emission. This decoding produces a probability on the encoded bits at output. The decoder can process soft information at input as well as at output.

Then, an interlacing 217 identical to the one performed at emission (192) is carried out. Then, a modulation 218, again identical to the one performed at emission, is carried out. This modulation can accept soft data at input and can produce symbols at output that take account of the confidence level of the input bits, i.e. of the weighted symbols. These symbols are then pre-encoded 219 as at emission and interlaced 2110 just as at emission. The result $\bar{s}^{(p-1)}$ is reintroduced into the next iteration or, for the last iteration, taken into account for the remainder of the processing operation.

9. Joint Diagonalization and Equalization

Figure 22:
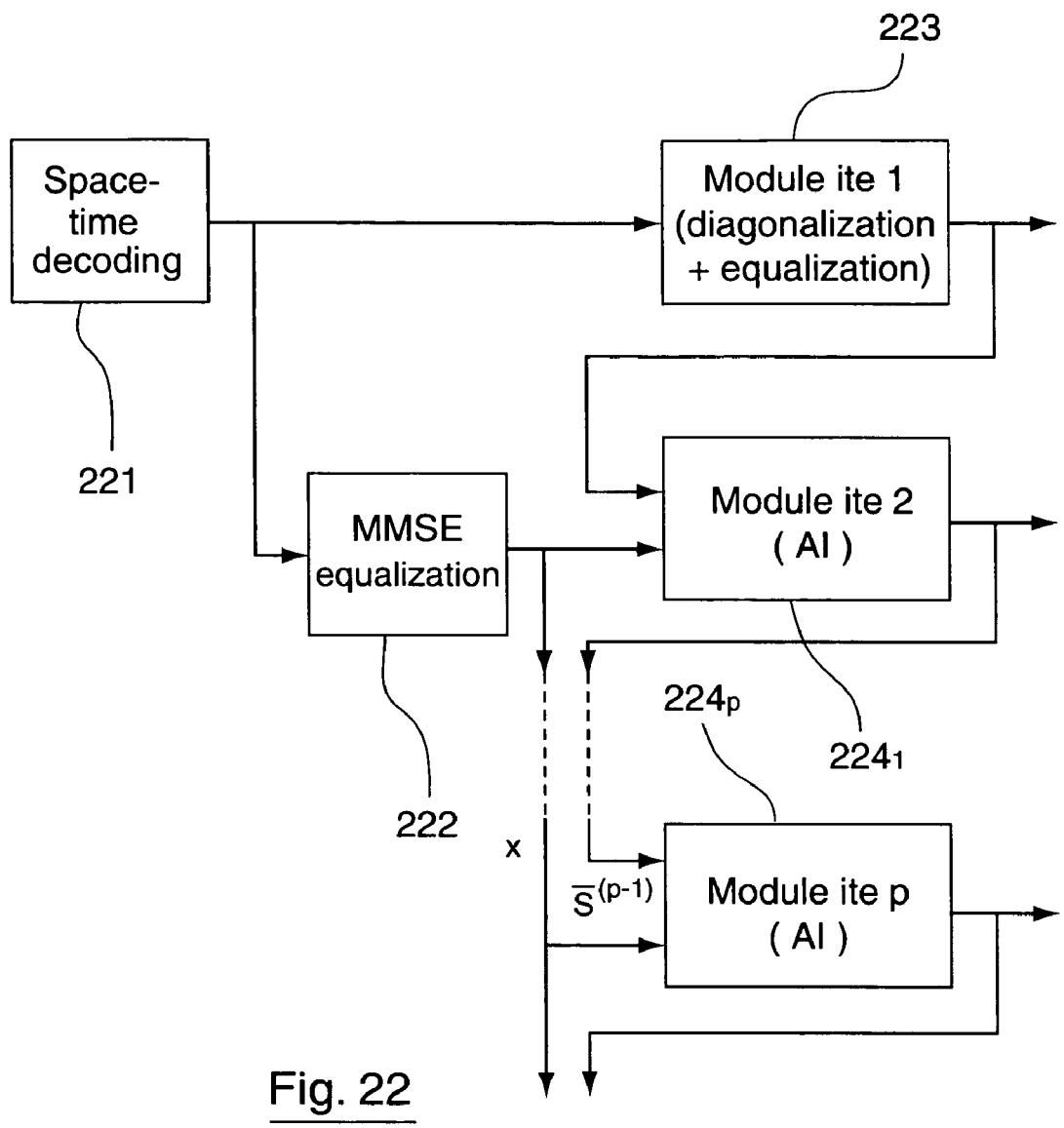
FIGS. 22 and 23 illustrate an embodiment of the invention in which a joint diagonalization and equalization are performed.

The equalization can be integrated into the diagonalization as illustrated in FIG. 22. In accordance with previous systems, the received signal is first decoded (space-time decoding module 221); it is then diagonalized and equalized (diagonalization and equalization module 223). In the MMSE case, the operation consists in multiplying the decoded signal by the matrix:

$$\left(H^H H + \frac{1}{SNR}I\right)^{-1}$$

where H is the matrix representing the encoding and the channel defined here above, SNR is the signal-to-noise ratio; I is the identity matrix and $(.)^{-1}$ is the matrix inversion operation. In the ZF case, the decoded signal is multiplied by the matrix $(H^H H)^{-1}$.

Then, the symbols are estimated by classic methods.

Figure 23:
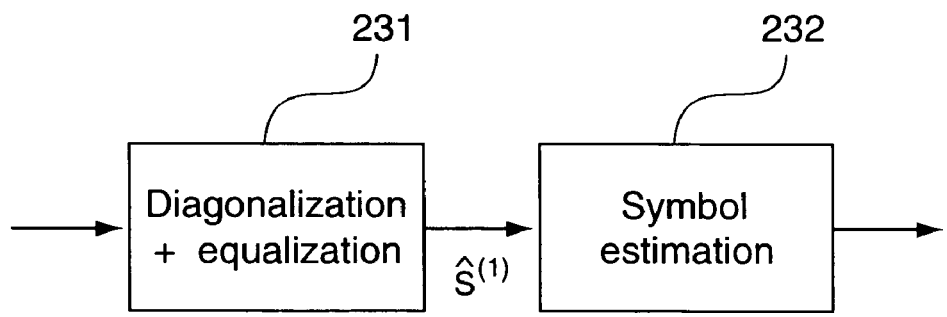

The following iterations take account of the MMSE equalization 22 performed on the data delivered by the space-time decoding 221. An iteration is illustrated by FIG. 23.

It therefore includes a diagonalization and equalization step 231 using the matrix:

$$\left(H^H H + \frac{1}{SNR}I\right)^{-1}$$

in the MMSE case, then a symbol estimation step 232.

It is always possible to integrate the pre-encoding and/or channel encoding in compliance with the sections 5 to 8.

10. Improvement of Channel Estimation

Figure 19:
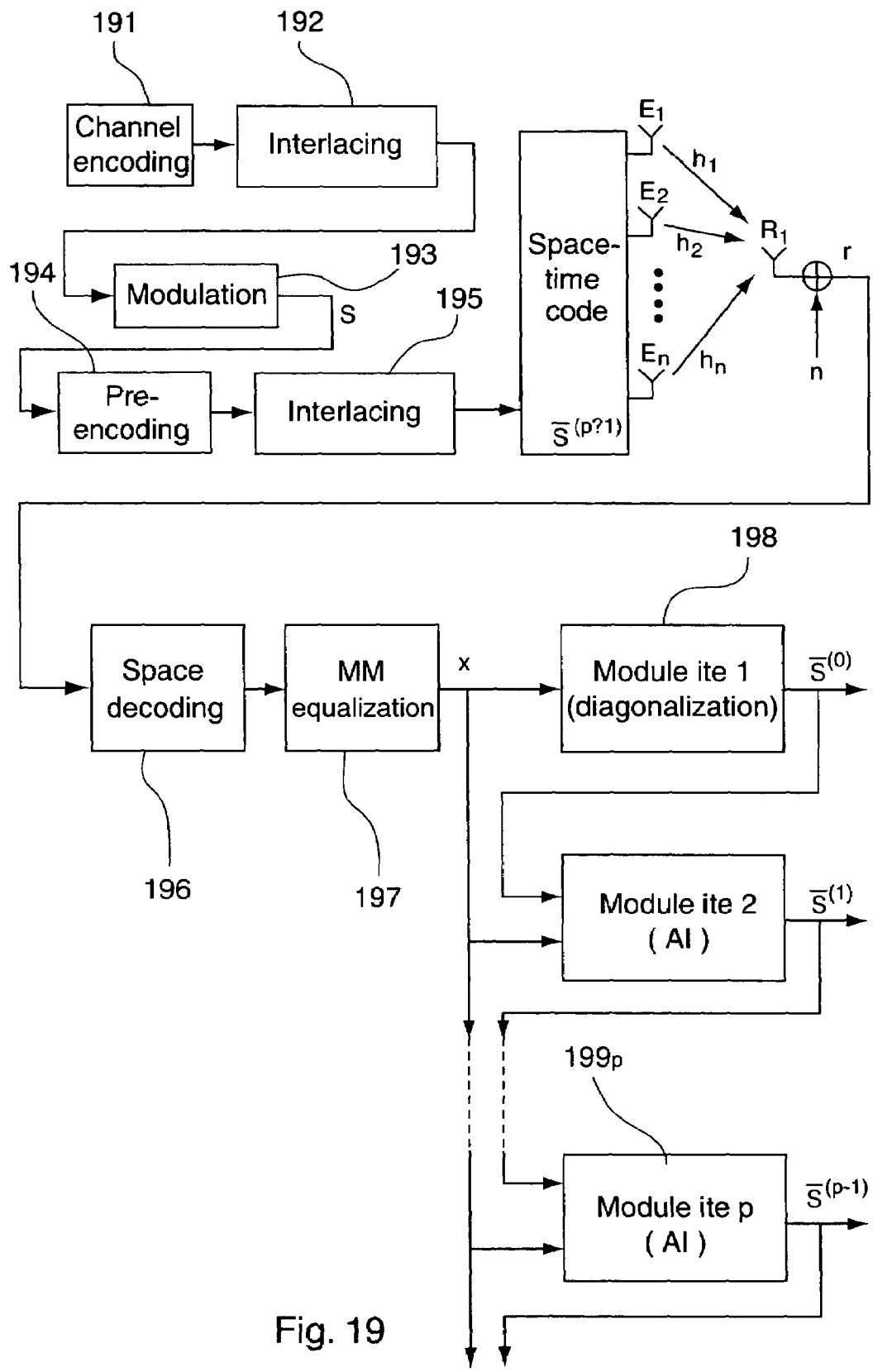
FIGS. 19 to 21 illustrate yet another embodiment of the invention in which a channel encoding is also implemented.

It is possible to introduce the channel estimation into the iterations. The channel estimation is classically done upstream to the functions described in the document. It is supposed to be done perfectly before the space-time decoding, since the pieces of data hi are necessary for this function 196 of FIG. 19 as a less foremost of the following functions (equalization, diagonalizaton, channel decoding etc).

It is possible to envisage a mode of operation in which the data estimated at the end of each iteration may be used for a new channel estimation conducted in parallel. The data hi newly estimated may be used for the next iteration.

Figure 24:
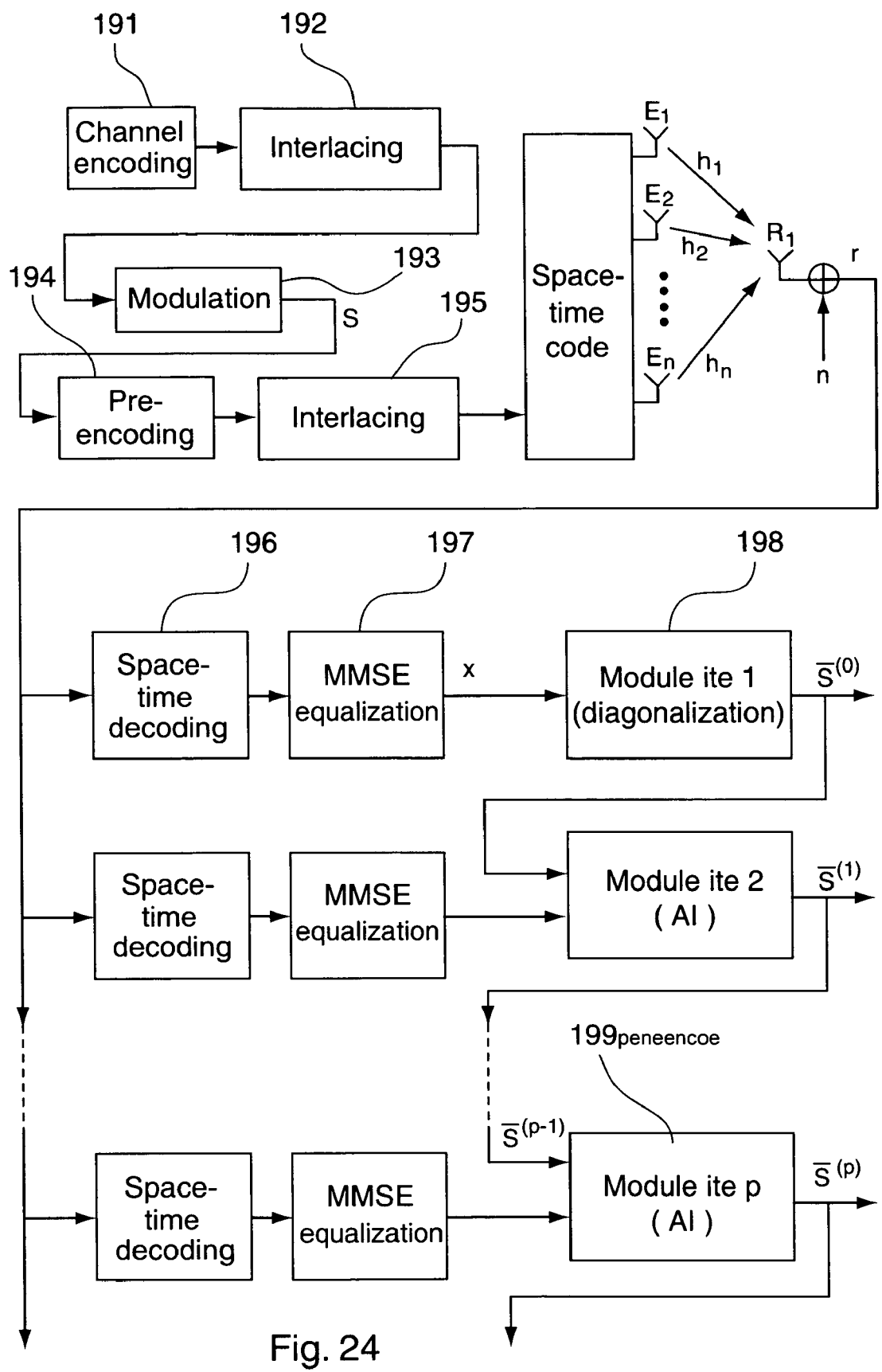
FIG. 24 presents a variant of the invention, implementing a channel estimation.

It is also possible to loop with the module 196 as in FIG. 24. In this case, each iteration has space-time decoding, equalization and a module as described here above.

11. The Advantages of the Invention

According to these different aspects, one or more embodiments of the invention have numerous advantages, such as:
- reconstruction, taking account of reliability levels as the iterations (to be included for example in the scheme with pre-encoding) are performed;
- possible application to channels with IES;
- use of any number of antennas (4, 8, . . . );
- use with any space-time code;
- association with diversity pre-encoding;
- implementation of an equalization, etc.

The efficiency of the method of an embodiment of the invention can be further improved by implementing automatic gain control (AGC) before or after said equalization step and/or during said iterations.

One or more embodiments of the invention overcome the different drawbacks of the prior art.

More specifically, one or more embodiments of the invention provide a technique for the decoding of space-time codes that is more efficient than prior art techniques, while at the same time showing reduced complexity.

Thus, one or more embodiments of the invention provide a technique of this kind, implementing a non-orthogonal space-time encoding matrix, which however does not rely on a maximum likelihood criterion.

In other words, one or more embodiments of the invention provide a technique of this kind that can be implemented practically and realistically in receivers at acceptable cost, in a system implementing a large number of antennas (4, 8 or more antennas) and/or a modulation with a large number of states.

One or more embodiments of the invention provide a technique of this kind that is more efficient in particular than the one proposed by Boariu, and is not limited to a particular class of codes but is, on the contrary, applicable to all block space-time codes, whatever their efficiency. Similarly, one or more embodiments of the invention enable the use of matrices having a size greater than that of the space-time encoding.

Although the present invention has been described with reference to preferred embodiments, workers skilled in the art will recognize that changes may be made in form and detail without departing from the spirit and scope of the invention.

APPENDIX 1

References

1. Tujkovic D., "Recursive Space-Time Treillis Codes for Turbo coded Modulation", IEEE GLOBECOM, 2000, p. 1010-1015, vol. 2.
2. Jayaweera S. K., Poor H. V., "Turbo (iterative) decoding of a unitary space-time code with a convolutional code", IEEE VTC Spring 2002, p. 1020-1024, vol. 2.
3. Guillen i Fabregas A., Caire G., "Analysis and design of natural and threaded space-time codes with iterative decoding", Conference on Signals, Systems and Computers, 2002, p. 279-283, Vol. 1.
4. G. Bauch, N. Al-Dahir, "Reduced-complexity Space-Time Turbo-Equalization for Frequency-Selective MIMO Channels", IEEE journal on Selected areas in communications, 2002.
5. Boariu A., Ionescu M., "A class of nonorthogonal rate-one space-time block codes with controlled interference", IEEE trans. on wireless comm., March 2003, pp. 270-276, vol. 2.
6. Tirkkonen O., Boariu A. et Hottinen A., "Minimal non-orthonality rate 1 space-time block code for 3+ tx antennas, in proceedings of IEEE ISSTA'00, September 2000, New Jersey, USA.
7. Jafarkhani H., "A Quasi-Orthogonal Space-Time Block Code", IEEE WCNC, 2000, p. 1457-1458 vol. 1.
8. Alamouti S. M., "A Simple Transmitter Diversity Scheme for Wireless Communications", IEEE JSAC, October 1998, p. 1457-1458.
9. Tarokh V., Jafarkhani H. et Calderbanck R. "Space-time block coding for wireless communications: performance results", IEEE JSAC, March 1999, pp. 451-460, vol. 17.
10. V. Le Nir et M. Hélard, "Reduced-complexity space-time block coding and decoding schemes with block linear pre-ceding", Electronics Letters, 10 Jul. 2003, Vol. 39, No 14.

The invention claimed is:

1. A method for the decoding of a received signal comprising symbols distributed in at least one of space, time or frequency by a space-time or space-frequency encoding matrix, wherein the method implements the following steps:
a space-time decoding, which is the inverse of a space-time encoding implemented at emission, delivering a decoded signal;
an equalization of said decoded signal, delivering an equalized signal;
a first estimation of the symbols forming the received signal, delivering an estimated signal, wherein said first estimation comprises the following steps:
diagonalization, by multiplication of the equalized signal by a diagonalization matrix, leading to a diagonal total encoding/channel/decoding matrix taking account of at least said encoding matrix, and of a decoding matrix that is the conjugate transpose of said encoding matrix;
first diversity pre-decoding, which is the inverse of a diversity pre-encoding implemented at emission of said signal, fed by the diagonalization step and delivering first pre-decoded data;
estimation of the symbols forming said received signal, from said first pre-decoded data, delivering the estimated symbols;
first diversity pre-encoding, identical to said diversity pre-encoding implemented at emission, applied to said estimated symbols, to give the estimated signal;
and at least one iteration of an interference cancellation step, each iteration comprising the following sub-steps:
subtraction, from said equalized signal, of said estimated signal multiplied by an interference matrix, delivering an optimized signal;
second diversity pre-decoding of said optimized signal, which is the inverse of a diversity pre-encoding implemented at emission, delivering second pre-decoded data;
estimation of the symbols forming said optimized signal, from said second pre-decoded data, delivering new estimated symbols; and second diversity pre-encoding, identical to said diversity pre-encoding implemented at emission, applied to said new estimated symbols, to give a new estimated signal, except for the last iteration.

2. The method according to claim 1, wherein:
said space-time decoding and equalization steps, or
said equalization and diagonalization steps, or
said space-time decoding, equalization and diagonalization steps, are done jointly.

3. The method according to claim 1, wherein said distributed symbols are emitted by means of at least two antennas, which produce different corresponding transmission channels and wherein the method of decoding takes the different corresponding transmission channels comprehensively into account.

4. The method according to claim 1, wherein said equalization step implements an equalization according to one of the techniques belonging to the group comprising:
Minimum Mean Squared Error type equalization;
Equal Gain Combining type equalization;
Zero Forcing type equalization; and
equalization taking account of a piece of information representing a signal-to-noise ratio between the received signal and a reception noise.

5. The method according to claim 1, wherein said steps of symbol estimation implement a soft decision, associating a piece of confidence information with the soft decision and said subtraction step or steps take account of said pieces of confidence information.

6. The method according to claim 1, wherein said received signal comprises a multicarrier signal.

7. The method according to claim 1, wherein said pre-encoding is obtained by one of the following methods:
a spread-spectrum technique; and
linear pre-encoding.

8. The method according to claim 1, wherein the method implements an automatic gain control step at least:
before or after said equalization step, or
during at least one of said iterations.

9. The method according to claim 1 and further comprising a channel-decoding step, symmetrical with a channel-encoding step implemented at emission.

10. The method according to claim 9, wherein said channel-decoding step implements a turbo-decoding operation.

11. The method according to claim 1 and further comprising at least one de-interlacing step and at least one re-interlacing step, corresponding to an interlacing implemented at emission.

12. The method according to claim 1 and further comprising a step of improvement of a channel estimation, taking account of the estimated symbols during at least one of said iterations.

13. The method according to claim 1 and further comprising transmitting by four antennas the signal to be received, referred to as the received signal, through at least one transmission channel, wherein said total encoding/channel/decoding matrix is equal to:

$$G = \gamma \begin{bmatrix} A & 0 & 0 & J \\ 0 & A & -J & 0 \\ 0 & -J & A & 0 \\ J & 0 & 0 & A \end{bmatrix}$$

with:

$$A = |h_1|^2 + |h_2|^2 + |h_3|^2 + |h_4|^2$$

$$J = 2Re\{h_1 h^*_4 - h_2 h^*_3\}, \text{ representing the interference,}$$
and $$\gamma = \frac{1}{|h_1|^2 + |h_2|^2 + |h_3|^2 + |h_4|^2 + \frac{1}{SNR}}$$

where: $H = \begin{bmatrix} h_1 & h_2 & h_3 & h_4 \\ -h^*_2 & h^*_1 & -h^*_4 & h^*_3 \\ -h^*_3 & -h^*_4 & h^*_1 & h^*_2 \\ h_4 & -h_3 & -h_2 & h_1 \end{bmatrix}$ is a matrix grouping the space-time encoding and the transmission channel,
and SNR represents the signal-to-noise ratio.

14. The method according to claim 1 and further comprising transmitting by eight antennas the signal to be received, referred to as the received signal, through at least one transmission channel, wherein said total encoding/channel/decoding matrix is equal to:

$$G = \gamma \cdot H^H \cdot H = \gamma \begin{bmatrix} A & 0 & 0 & 0 & J & 0 & 0 & 0 \\ 0 & A & 0 & 0 & 0 & J & 0 & 0 \\ 0 & 0 & A & 0 & 0 & 0 & J & 0 \\ 0 & 0 & 0 & A & 0 & 0 & 0 & J \\ J & 0 & 0 & 0 & A & 0 & 0 & 0 \\ 0 & J & 0 & 0 & 0 & A & 0 & 0 \\ 0 & 0 & J & 0 & 0 & 0 & A & 0 \\ 0 & 0 & 0 & J & 0 & 0 & 0 & A \end{bmatrix}$$

with $A = 2 \cdot (|h_1|^2 + |h_2|^2 + |h_3|^2 + |h_4|^2 + |h_5|^2 + |h_6|^2 + |h_7|^2 + |h_8|^2)$ and
$J = 2\text{Re}\{h_1 h^*_5 + h_2 h^*_6 + h_3 h^*_7 + h_4 h^*_8\}$ and $$\gamma = \frac{1}{2} \cdot \frac{1}{|h_1|^2 + |h_2|^2 + |h_3|^2 + |h_4|^2 + |h_5|^2 + |h_6|^2 + |h_7|^2 + |h_8|^2 + \frac{1}{SNR}}$$

where: $H = \begin{bmatrix} h_1 & h_2 & h_3 & h_4 & h_5 & h_6 & h_7 & h_8 \\ h_2 & -h_1 & h_4 & -h_3 & h_6 & -h_5 & h_8 & -h_7 \\ h_3 & -h_4 & -h_1 & h_2 & h_7 & -h_8 & -h_5 & h_6 \\ h_4 & h_3 & -h_2 & -h_1 & h_8 & h_7 & -h_6 & -h_5 \\ h^*_1 & h^*_2 & h^*_3 & h^*_4 & h^*_5 & h^*_6 & h^*_7 & h^*_8 \\ h^*_2 & -h^*_1 & h^*_4 & -h^*_3 & h^*_6 & -h^*_5 & h^*_8 & -h^*_7 \\ h^*_3 & -h^*_4 & -h^*_1 & h^*_2 & h^*_7 & -h^*_8 & -h^*_5 & h^*_6 \\ h^*_4 & h^*_3 & -h^*_2 & -h^*_1 & h^*_8 & h^*_7 & -h^*_6 & -h^*_5 \\ h_5 & h_6 & h_7 & h_8 & h_1 & h_2 & h_3 & h_4 \\ h_6 & -h_5 & h_8 & -h_7 & h_2 & -h_1 & h_4 & -h_3 \\ h_7 & -h_8 & -h_5 & h_6 & h_3 & -h_4 & -h_1 & h_2 \\ h_8 & h_7 & -h_6 & -h_5 & h_4 & h_3 & -h_2 & -h_1 \\ h^*_5 & h^*_6 & h^*_7 & h^*_8 & h^*_1 & h^*_2 & h^*_3 & h^*_4 \\ h^*_6 & -h^*_5 & h^*_8 & -h^*_7 & h^*_2 & -h^*_1 & h^*_4 & -h^*_3 \\ h^*_7 & -h^*_8 & -h^*_5 & h^*_6 & h^*_3 & -h^*_4 & -h^*_1 & h^*_2 \\ h^*_8 & h^*_7 & -h^*_6 & -h^*_5 & h^*_4 & h^*_3 & -h^*_2 & -h^*_1 \end{bmatrix}$, is a matrix grouping the space-time encoding and the transmission channel and SNR represents the signal-to-noise ratio.

15. The method of claim 14 and further comprising, prior to the step of transmitting, encoding said signal to be received, wherein the encoding implements a space-time encoding such that:

$$H = \begin{bmatrix} h_1 & h_2 & h_3 & h_4 & h_5 & h_6 & h_7 & h_8 \\ h_2 & -h_1 & h_4 & -h_3 & h_6 & -h_5 & h_8 & -h_7 \\ h_3 & -h_4 & -h_1 & h_2 & h_7 & -h_8 & -h_5 & h_6 \\ h_4 & h_3 & -h_2 & -h_1 & h_8 & h_7 & -h_6 & -h_5 \\ h_1^* & h_2^* & h_3^* & h_4^* & h_5^* & h_6^* & h_7^* & h_8^* \\ h_2^* & -h_1^* & h_4^* & -h_3^* & h_6^* & -h_5^* & h_8^* & -h_7^* \\ h_3^* & -h_4^* & -h_1^* & h_2^* & h_7^* & -h_8^* & -h_5^* & h_6^* \\ h_4^* & h_3^* & -h_2^* & -h_1^* & h_8^* & h_7^* & -h_6^* & -h_5^* \\ h_5 & h_6 & h_7 & h_8 & h_1 & h_2 & h_3 & h_4 \\ h_6 & -h_5 & h_8 & -h_7 & h_2 & -h_1 & h_4 & -h_3 \\ h_7 & -h_8 & -h_5 & h_6 & h_3 & -h_4 & -h_1 & h_2 \\ h_8 & h_7 & -h_6 & -h_5 & h_4 & h_3 & -h_2 & -h_1 \\ h_5^* & h_6^* & h_7^* & h_8^* & h_1^* & h_2^* & h_3^* & h_4^* \\ h_6^* & -h_5^* & h_8^* & -h_7^* & h_2^* & -h_1^* & h_4^* & -h_3^* \\ h_7^* & -h_8^* & -h_5^* & h_6^* & h_3^* & -h_4^* & -h_1^* & h_2^* \\ h_8^* & h_7^* & -h_6^* & -h_5^* & h_4^* & h_3^* & -h_2^* & -h_1^* \end{bmatrix}.$$

16. A receiver for receiving a received signal, comprising symbols distributed in at least one of space, time, or frequency by a space-time encoding matrix, wherein the receiver comprises:
  means of space-time decoding that is the inverse of a space-time encoding implemented at emission, delivering a decoded signal;
  means of equalization of said decoded signal, delivering an equalized signal;
  first estimation means for the estimation of the symbols forming the received signal, delivering an estimated signal;
  wherein said first estimation means comprises:
    means of diagonalization, by multiplying the equalized signal by a diagonalization matrix leading to a diagonal total encoding/channel/decoding matrix taking account of at least said encoding matrix and of a decoding matrix that is the conjugate transpose of said encoding matrix;
    means of first diversity pre-decoding, performing a first pre-decoding which is the inverse of a diversity pre-encoding implemented at emission of said signal, fed by the diagonalization step and delivering the first pre-decoded data;
    first estimation means for the estimation of the symbols forming said received signal, from said first pre-decoded data delivering the estimated symbols; and
    means of first diversity pre-encoding, performing a pre-encoding which is identical to said diversity pre-encoding implemented at emission, applied to said estimated symbols, to give the estimated signal;
  means for subtraction, from said equalized signal, of said estimated signal multiplied by an interference matrix, delivering an optimized signal;
  means of second diversity pre-decoding of said optimized signal, performing a second pre-decoding which is the inverse of the diversity pre-encoding implemented at emission, delivering second pre-decoded data;
  second estimation means for the estimation of the symbols forming said optimized signal, from the second pre-decoded data, delivering new estimated symbols; and
  means of second diversity pre-encoding, performing a pre-encoding identical to said diversity pre-encoding implemented at emission, applied to said new estimated symbols, to give a new estimated signal, except for the last iteration,
  each symbol being processed by said means at least once.

17. A method for the decoding of a received signal comprising symbols distributed in at least one of space, time, or frequency by means of a space-time or space-frequency encoding matrix, wherein the method comprises:
  diagonalization, obtained from a total encoding/channel/decoding matrix taking account of at least said encoding matrix, of a decoding matrix, corresponding to the matrix that is the conjugate transpose of said encoding matrix;
  demodulation, symmetrical with a modulation implemented at emission;
  de-interlacing symmetrical with an interlacing implemented at emission;
  channel decoding symmetrical with a channel encoding implemented at emission;
  re-interlacing, identical with the interlacing implemented at emission;
  re-modulation identical with the modulation implemented at emission, delivering an estimated signal; and
  at least one iteration of an interference cancellation step comprising a subtraction from an equalized signal of said estimated signal multiplied by an interference matrix, delivering an optimized signal.

* * * * *

UNITED STATES PATENT AND TRADEMARK OFFICE
CERTIFICATE OF CORRECTION

PATENT NO.        : 7,729,436 B2                                          Page 1 of 1
APPLICATION NO.   : 10/568942
DATED             : June 1, 2010
INVENTOR(S)       : Helard et al.

It is certified that error appears in the above-identified patent and that said Letters Patent is hereby corrected as shown below:

On Title Page
Item [57] ABSTRACT
Change both occurrences of "preceding" to --precoding-- in line 10.

Signed and Sealed this
Twenty-sixth Day of April, 2011

David J. Kappos
*Director of the United States Patent and Trademark Office*